United States Patent
Konanur et al.

(10) Patent No.: US 11,201,492 B2
(45) Date of Patent: Dec. 14, 2021

(54) DETECTING OBJECTS PLACED ON WIRELESS CHARGER

(71) Applicant: Intel Corporation, Santa Clara, CA (US)

(72) Inventors: Anand S. Konanur, San Jose, CA (US); Lei Shao, Sunnyvale, CA (US); Steven G. Gaskill, Corvallis, OR (US); Xintian E. Lin, Mountain View, CA (US); Songnan Yang, San Jose, CA (US); Jason Ku, San Mateo, CA (US); Jie Gao, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 493 days.

(21) Appl. No.: 14/757,918

(22) Filed: Dec. 24, 2015

(65) Prior Publication Data

US 2017/0187221 A1    Jun. 29, 2017

(51) Int. Cl.
*H02J 7/02* (2016.01)
*H02J 50/12* (2016.01)
*H02J 50/80* (2016.01)
*H02J 7/00* (2006.01)

(52) U.S. Cl.
CPC .......... *H02J 7/025* (2013.01); *H02J 7/00036* (2020.01); *H02J 7/027* (2013.01); *H02J 50/12* (2016.02); *H02J 50/80* (2016.02); *H02J 7/00034* (2020.01); *H02J 7/00045* (2020.01)

(58) Field of Classification Search
CPC ..................................................... H02J 7/025
See application file for complete search history.

(56) References Cited

U.S. PATENT DOCUMENTS

| | | | |
|---|---|---|---|
| 2008/0157909 A1* | 7/2008 | Chen | H02M 3/33523 336/105 |
| 2012/0068550 A1* | 3/2012 | Boer | H02J 7/025 307/104 |
| 2012/0248891 A1* | 10/2012 | Drennen | H02J 7/025 307/104 |
| 2013/0285604 A1* | 10/2013 | Partovi | H02J 7/0042 320/108 |

(Continued)

FOREIGN PATENT DOCUMENTS

KR    WO2014171774    * 10/2014    ............. H02J 7/025

OTHER PUBLICATIONS

WO2014171774 Translation, Won, Oct. 2014, Wirless Power Transmission apparatus.*

(Continued)

*Primary Examiner* — Drew A Dunn
*Assistant Examiner* — Tynese V McDaniel
(74) *Attorney, Agent, or Firm* — Schiff Hardin LLP

(57) ABSTRACT

A method of wirelessly charging batteries of devices includes detecting at least two devices being simultaneously present on a charging mat. It is determined, for each of the at least two devices, whether the device is compatible with a wireless charging standard. It is determined, for each of the two devices, whether the device is enabled for a near field communication. Charging of the devices is prevented if at least one of the devices is enabled for a near field communication but not compatible with the wireless charging standard.

22 Claims, 26 Drawing Sheets

(56) References Cited

U.S. PATENT DOCUMENTS

| | | | |
|---|---|---|---|
| 2014/0125355 A1* | 5/2014 | Grant | B64D 11/06 |
| | | | 324/629 |
| 2016/0065005 A1* | 3/2016 | Won | H04B 5/0037 |
| | | | 307/104 |
| 2016/0295351 A1* | 10/2016 | O'Donoghue | H04W 4/50 |
| 2017/0353054 A1* | 12/2017 | Lee | H02J 50/12 |

OTHER PUBLICATIONS

Bluetooth SIG, Brand Your Product_Bluetooth Technology Website, 2018.*

Yang, Songnan, U.S. Appl. No. 62/180,951, filed Jun. 17, 2015, US Application and Drawings attached (21 pages), not yet published.

* cited by examiner

100

X = Charging
- = Not Charging

|  |  | Device 2 Added to Mat | | | | | | | |
|---|---|---|---|---|---|---|---|---|---|
|  |  | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover / Wallet |
| Device 1 Currently on Mat | Nothing | - | - | - | - | X | - | X | X | - |
|  | NFC Tag | - | - | - | - | - | - | - | - | - |
|  | Phone with Nothing | - | - | - | - | X | - | X | X | - |
|  | Phone with NFC | - | - | - | - | - | - | - | - | - |
|  | Phone with A4WP | X | - | X | - | X | X | X | X | - |
|  | Phone with NFC & A4WP | X | - | X | - | X | X | X | X | - |
|  | Phone with A4WP Sleeve / Dongle | X | - | X | - | X | X | X | X | - |
|  | Phone with NFC & A4WP Sleeve / Dongle | X | - | X | - | X | X | X | X | - |
|  | Phone with A4WP & NFC Tag in Cover / Wallet | - | - | - | - | - | - | - | - | - |

FIG. 3

| 7 | 6 | 5 | 4 | 3 | 2 | 1 | 0 |
|---|---|---|---|---|---|---|---|
| NFC Receiver | Separate BTLE Radio in PRU | Power Control Algorithm Preference | Adjust Power Capability | Charge Complete Connected Mode | RFU | RFU | RFU |
| 0 = Not Supported 1 = Supported | 0 = Not Supported 1 = Supported | 0 = VRECT_MIN_ERROR 1 = Max System Efficiency | 0 = Not Supported 1 = Supported | 0 = Not Supported 1 = Supported | | | |

FIG. 5

X = Charging
- = Not Charging

| | | Device 2 Added to Mat | | | | | | | |
|---|---|---|---|---|---|---|---|---|---|
| | | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover / Wallet |
| Device 1 Currently on Mat | Nothing | - | - | - | - | X | X | X | X | - |
| | NFC Tag | - | - | - | - | - | - | - | - | - |
| | Phone with Nothing | - | - | - | - | X | X | X | X | - |
| | Phone with NFC | - | - | - | - | - | - | - | - | - |
| | Phone with A4WP | X | - | X | - | X | X | X | X | X |
| | Phone with NFC & A4WP | X | - | X | - | X | X | X | X | X |
| | Phone with A4WP Sleeve / Dongle | X | - | X | - | X | X | X | X | X |
| | Phone with NFC & A4WP Sleeve / Dongle | X | - | X | - | - | - | - | - | X |
| | Phone with A4WP & NFC Tag in Cover / Wallet | - | - | - | - | X | X | X | X | - |

FIG. 6

| Detector / Sensor | Time Duration, Millisec | Comments |
|---|---|---|
| Capacitive Sensor | 10 | |
| NFC Polling | 100 | A Function of the Number of NFC Technologies Polled for. Can be Reduced |
| ROD | 400 | Two Measurements Required, Each of 100 ms Separated by 200 ms. This Duration can be Used for NFC Polling |
| BLE Advertisement | ~ 1 | |

FIG. 8

X = Charging
- = Not Charging

| | | Device 2 Added to Mat | | | | | | | |
|---|---|---|---|---|---|---|---|---|---|
| | | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover |
| Device 1 Currently on Mat | Nothing | - | - | - | - | X | X | X | X | - |
| | NFC Tag | - | - | - | - | - | - | - | - | - |
| | Phone with Nothing | - | - | - | - | X | X | X | X | - |
| | Phone with NFC | - | - | - | - | - | - | - | - | - |
| | Phone with A4WP | X | - | X | - | X | X | X | X | - |
| | Phone with NFC & A4WP | - | - | - | - | - | X | - | X | - |
| | Phone with A4WP Sleeve / Dongle | X | - | X | - | X | X | X | X | - |
| | Phone with NFC & A4WP Sleeve / Dongle | - | - | - | - | - | X | - | X | - |
| | Phone with A4WP & NFC Tag in Cover | - | - | - | - | X | X | - | X | - |

FIG. 10

X = Charging
- = Not Charging

| | | Device 2 Added to Mat | | | | | | | |
|---|---|---|---|---|---|---|---|---|---|
| | | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover |
| Device 1 Currently on Mat | Nothing | - | - | - | - | X | X | X | X | - |
| | NFC Tag | - | - | - | - | - | - | - | - | - |
| | Phone with Nothing | - | - | - | - | X | X | X | X | - |
| | Phone with NFC | - | - | - | - | - | - | - | - | - |
| | Phone with A4WP | X | - | X | - | X | X | X | X | X |
| | Phone with NFC & A4WP | X | - | X | - | X | X | X | X | X |
| | Phone with A4WP Sleeve / Dongle | X | - | X | - | X | X | X | X | X |
| | Phone with NFC & A4WP Sleeve / Dongle | X | - | X | - | X | X | X | X | X |
| | Phone with A4WP & NFC Tag in Cover | - | - | - | - | - | X | - | X | - |

FIG. 12

X = Charging
- = Not Charging

| | | Device 2 Added to Mat | | | | | | | | |
|---|---|---|---|---|---|---|---|---|---|---|
| | | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover |
| | Nothing | - | - | - | - | X | - | X | X | X |
| | NFC Tag | - | - | - | - | - | - | - | - | - |
| | Phone with Nothing | - | - | - | - | X | - | X | X | X |
| | Phone with NFC | - | - | - | - | - | - | - | - | - |
| Device 1 Currently on Mat | Phone with A4WP | X | - | X | - | X | X | X | X | X |
| | Phone with NFC & A4WP | X | - | X | - | X | X | X | X | X |
| | Phone with A4WP Sleeve / Dongle | X | - | X | - | X | X | X | X | X |
| | Phone with NFC & A4WP Sleeve / Dongle | X | - | X | - | X | X | X | X | X |
| | Phone with A4WP & NFC Tag in Cover | X | - | X | - | X | X | X | X | X |

FIG. 14

X = Charging
0 = Not Charging

|  |  | Device 2 Added to Mat | | | | | | | | |
|---|---|---|---|---|---|---|---|---|---|---|
|  |  | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover |
| Device 1 Currently on Mat | Nothing | 0 | 0 | 0 | 0 | X | X | X | X | 0 |
|  | NFC Tag | 0 | 0 | 0 | 0 | 0 | 0 | 0 | 0 | 0 |
|  | Phone with Nothing | 0 | 0 | 0 | 0 | X | X | X | X | 0 |
|  | Phone with NFC | 0 | 0 | 0 | 0 | 0 | 0 | 0 | 0 | 0 |
|  | Phone with A4WP | X | 0 | X | 0 | X | X | X | X | 0 |
|  | Phone with NFC & A4WP | X | 0 | X | 0 | X | X | X | X | 0 |
|  | Phone with A4WP Sleeve / Dongle | X | 0 | X | 0 | X | X | X | X | 0 |
|  | Phone with NFC & A4WP Sleeve / Dongle | X | 0 | X | 0 | X | X | X | X | 0 |
|  | Phone with A4WP & NFC Tag in Cover | 0 | 0 | 0 | 0 | 0 | 0 | 0 | 0 | 0 |

FIG. 16

X = Charging
- = Not Charging

| | | | Device 2 Added to Mat | | | | | | | |
|---|---|---|---|---|---|---|---|---|---|---|
| | | | Nothing | NFC Tag | Phone with Nothing | Phone with NFC | Phone with A4WP | Phone with NFC + A4WP | Phone with A4WP Sleeve / Dongle | Phone with NFC & A4WP Sleeve / Dongle | Phone with A4WP & NFC Tag in Cover / Wallet |
| Device 1 Currently on Mat | Nothing | - | - | - | - | X | X | X | X | - |
| | NFC Tag | - | - | - | - | - | - | - | - | - |
| | Phone with Nothing | - | - | - | - | X | X | X | X | - |
| | Phone with NFC | - | - | - | - | X | X | X | X | - |
| | Phone with A4WP | X | - | X | X | X | X | X | X | - |
| | Phone with NFC & A4WP | X | - | X | X | X | X | X | X | - |
| | Phone with A4WP Sleeve / Dongle | X | - | X | X | X | X | X | X | - |
| | Phone with NFC & A4WP Sleeve / Dongle | X | - | X | X | X | X | X | X | - |
| | Phone with A4WP & NFC Tag in Cover / Wallet | - | - | - | - | - | - | - | - | - |

FIG. 17

DETECTING OBJECTS PLACED ON WIRELESS CHARGER

TECHNICAL FIELD

This disclosure relates generally to techniques for wireless charging. Specifically, this disclosure relates to detecting and classifying RFID tags and objects placed on a wireless charger.

BACKGROUND ART

A basic wireless charging system may include a wireless power transmitter unit (PTU) and a wireless power receiving unit (PRU). For example, a PTU may include a transmit (Tx) coil, and a PRU may include a receive (Rx) coil. Magnetic resonance wireless charging may employ a magnetic coupling between the Tx coil and the Rx coil. In some cases, a PRU is implemented in a device having various size chassis. In some cases, PTU is configured as a constant current source even when various size chassis change a resonant frequency of magnetic coupling between the PRU and the PTU.

Wireless charging can sometimes cause heating in near field communication (NFC) tags and potentially in other NFC enabled devices depending on their thermal mass. However, specific NFC enabled devices such as phones and wearables may be designed with NFC protection features and be compatible with wireless charging.

BRIEF DESCRIPTION OF THE DRAWINGS

FIG. 3 is a truth table illustrating whether charging or no-charging should be performed for various scenarios of devices being introduced into an existing charging session.

FIG. 5 is a table extracted from a relevant section of the A4WP specification showing the NFC flag.

FIG. 6 is a truth table illustrating whether charging or no-charging should be performed for various scenarios of devices being introduced into an existing charging session that combines Rogue Object Detection with NFC and capacitive sensing.

FIG. 8 is a table illustrating the approximate timing for some of the operations in the flowchart of FIG. 7.

FIG. 10 is a truth table illustrating whether charging or no-charging should be performed for various scenarios of devices being introduced into an existing charging session according to the method of FIG. 9.

FIG. 12 is a truth table illustrating whether charging or no-charging should be performed for various scenarios of devices being introduced into an existing charging session according to the method of FIG. 11.

FIG. 14 is a truth table illustrating whether charging or no-charging should be performed for various scenarios of devices being introduced into an existing charging session according to the method of FIG. 13.

FIG. 16 is a truth table illustrating whether charging or no-charging should be performed for various scenarios of devices being introduced into an existing charging session according to the method of FIG. 15.

FIG. 17 is a truth table similar to FIG. 3 except that a phone with NFC does not necessarily prevent charging.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. Specifically, the techniques described herein include an apparatus in a wireless power transmitting unit (PTU) having a transmitter (Tx) coil configured to generate a magnetic field.

In some cases, when a tag or phone with NFC is placed on a charging surface, the tag can be damaged. On the other hand, summarily stopping charging whenever a phone with NFC is placed on the mat is disruptive to the user experience with wireless chargers. The power transmitting unit described herein can distinguish between ordinary NFC tags and phones with NFC that are not A4WP compatible on the one hand and NFC compatible A4WP phones and sleeves on the other, when such devices are placed on a power transmitting unit (PTU), also sometimes referred to as a charging mat.

The techniques described herein provide NFC tag protection for notebook computers, tablets, phones, and other devices. Various classes of devices that might be placed on a charging mat include NFC tags, NFC enabled A4WP compliant phones, NFC enabled A4WP non-compliant phones, and A4WP compliant phones with NFC tags stuck on case/sleeve.

A decision is made whether wireless charging may be performed by the PTU without damaging the devices placed on a charging mat. The decision may be dependent upon whether each of the two devices is A4WP compatible and/or NFC enabled. Inputs used in making the charging/no charging decision include a signal from a capacitive sensor which detects a device being placed near the charging mat; a measured change in charging impedance due to a device being introduced onto the charging mat; an input from an NFC reader; and an A4WP standard compliant response received from an A4WP compliant receiver, wherein a bit in the A4WP standard compliant response may indicate that the device is NFC enabled.

The techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
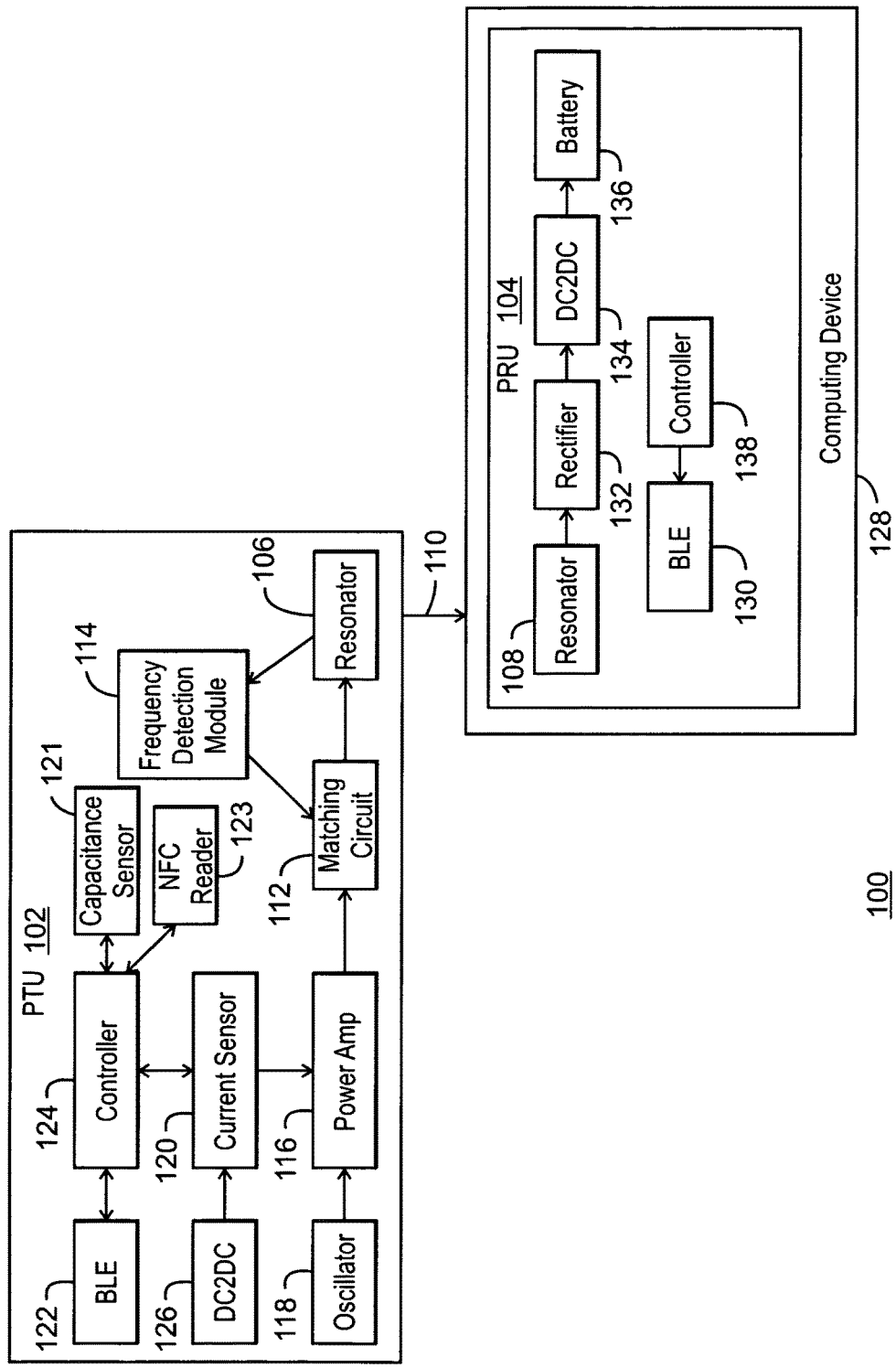
FIG. 1 is a block diagram of a PTU to provide power to a PRU.

FIG. 1 is block diagram of a PTU to provide power to a PRU, wherein the PTU includes a resonant frequency detection circuit. A PTU 102 may coupled to a PRU 104 via magnetic inductive coupling between resonators 106 and 108, as indicated by the arrow 110. The PRU 104 may be a component of a computing device 128 configured to receive charge by the inductive coupling 110. The resonator 106 may be referred to herein as a Tx coil 106 of the PTU 102. The resonator 108 may be referred to herein as an Rx coil 108 of the PRU 104.

The PRU 104 may include a matching circuit 112 configured to match the amplified oscillation provided to the resonator 106 of the PTU 102. The matching circuit 112 may include any suitable arrangement of electrical components such as capacitors, inductors, and other circuit elements that can be adjusted match the resonator 106 to the power amplifier 116. The operation of the matching circuit 112 can generate a reactance shift to compensate for detuning of the magnetic inductive coupling 110.

Other components of the PTU may include a power amplifier 116, and oscillator 118, a current sensor 120, a Bluetooth Low Energy (BLE) module 122, a controller 124, direct current to direct current (DC2DC) converter 126, and the like. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 140 of the PTU 102. The controller 140 may power on the power amplifier 116 configured to receive direct current (DC) from the DC2DC converter 126, and to amplify and oscillate the current. The oscillator 118 may be configured to oscillate the power provided at a given frequency.

As shown in FIG. 1, an inductive coupling 110 may occur between the Tx coil 106 and the Rx coil 108, and as a magnetic flux associated with the inductive coupling passes through the Rx coil 108 the computing device 111 may receive power. A rectifier 132 may receive voltage having an alternating current (AC) from the Rx coil 108 and may be configured to generate a rectified voltage (Vrect) having a direct current (DC). As illustrated in FIG. 1, a DC2DC converter 134 may provide a DC output to a battery 136.

The PRU 104 may also include a controller 138 configured to initiate a wireless broadcast having wireless handshake data. As discussed above, the wireless handshake broadcast may be carried out by a wireless data transmission component such as BLE module 130.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

The disclosure may provide a way of distinguishing between supported phones (and wearables such as smartwatches, bracelets, and fitness bands) and unsupported phones and tags by utilizing a combination of sensor and radio inputs.

The disclosure may include using multiple inputs to make a decision as to whether to charge a device that has been placed on a charging mat or to warn the user of the potential hazard and stop charging. These inputs may be:

1) Capacitive sensor—capable of sensing the change in capacitance associated with a grounded body (e.g., a user's hand) introducing an entity on the charging surface.
2) Foreign Object Detection/Rogue Object Detection scheme—capable of measuring the fine impedance changes seen by the PTU due to introduction of foreign objects/rogue objects on the charging mat.
3) NFC reader—capable of querying and asserting affirmatively that a NFC standard compliant tag, phone or tablet has been placed on the charging mat.
4) Bluetooth low energy (BLE) response from PRU—allowing the PTU to elicit an A4WP standard compliant response from A4WP compliant receivers, distinguishing them from non-A4WP compliant receivers. In addition, this PRU BLE registration response has one bit (ref; Table 50.1 A4WP standard) that indicates whether the PRU is aware of the existence of NFC in the device (Note: The flag does not indicate that NFC is protected, just that the device is aware of the presence of NFC).

Figure 2:
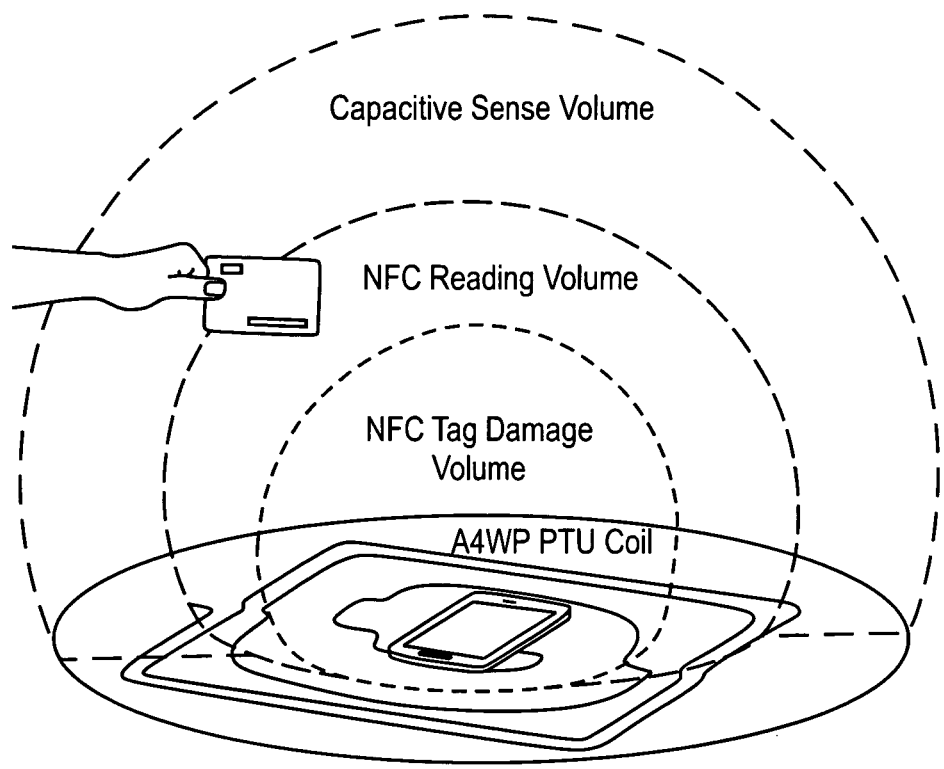
FIG. 2 is a schematic diagram of various detection radii associated with a charging mat.

FIG. 2 illustrates various device detection radii of a charging mat. The capacitive sensor triggers first, followed by NFC tag detection. The system may be engineered so that the Capacitive sense volume>NFC reading volume>NFC tag damage volume. A sensing range of the capacitive sensor may be greater than a reading range of an NFC tag, and the reading range of an NFC tag may be greater than a distance from the charging mat at which an NFC tag is damaged during charging. Responses from each of these sensors may be combined in a manner described below with reference to flowcharts to make a decision as to whether to charge a device or not. Depending on the desired behavior with regard to various classes of devices, each of the flowcharts may present a slightly different outcome.

FIG. 3 is a truth table illustrating whether charging or no-charging should be performed for various scenarios of two devices being simultaneously present on a charging mat. As can be seen, charging may be performed if at least one of the devices is A4WP compatible, and neither device is NFC enabled without being A4WP compatible.

Figure 4A:
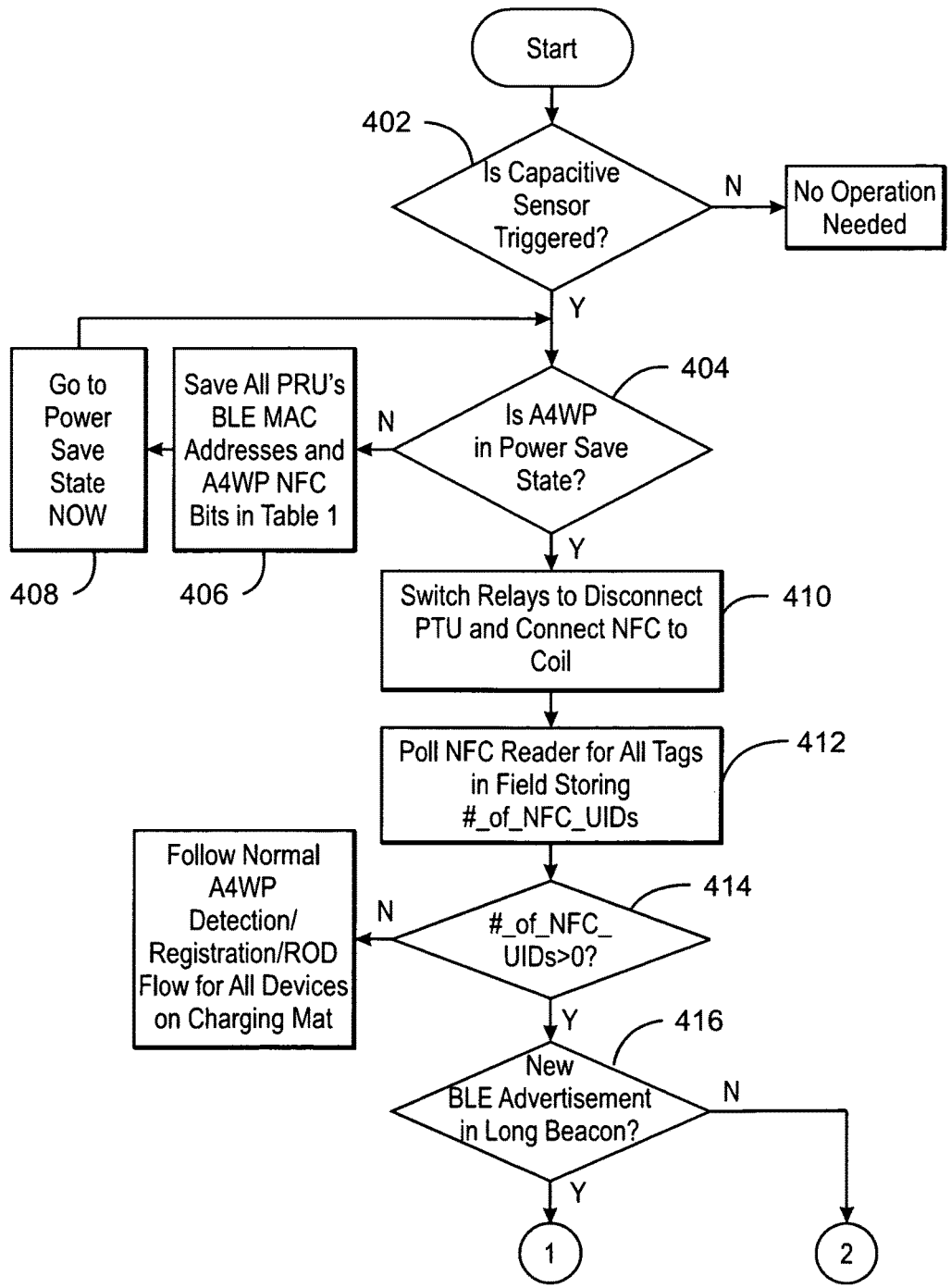
FIGS. 4A and 4B show a flowchart of A4WP PTU behavior according to one embodiment of the present disclosure.
Figure 4B:
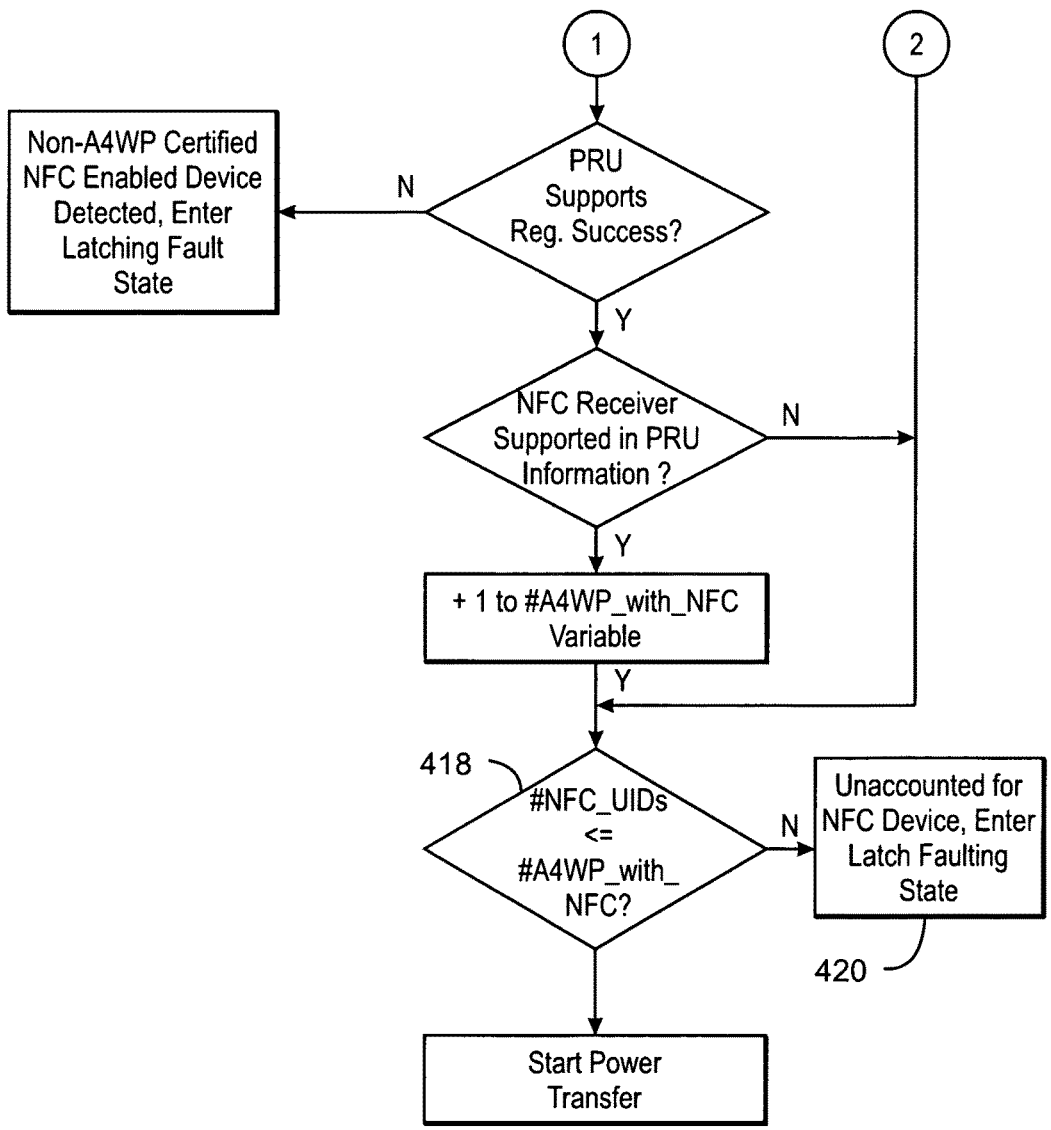

FIG. 4 is a flowchart of one embodiment of an inventive method 400 when an object is introduced during an active charging session. More specifically, method 400 may illustrate A4WP PTU behavior wherein an NFC tag is introduced during an active PTU session. Assume an A4WP approved PRU is actively charging on the PTU. As soon as a user places an NFC tag near the charging mat, the capacitive sensor is triggered in block 402. If the PTU is in the power transfer state (and not the power save state), as determined in block 404, the PTU may save all PRU's MAC addresses and A4WP NFC aware bits in block 406 and then immediately go to power save state in block 408. The NFC Poller in the PTU then gets control of the PTU coil in block 410 and polls for NFC unique identification numbers (UIDs) in block 412. Since an NFC tag was placed or detected, the No_of_UIDs variable goes up by one. The number of NFC UIDs being >1, as determined in block 414, the PTU microcontroller (MCU) then sends a BLE Long Beacon and waits for a new BLE A4WP device advertisement in block 416. Since no new A4WP compliant device was introduced, the MCU compares the number of NFC_UIDs (1) with the number of A4WP_with_NFC devices (0) in block 418. The number of NFC_UIDs being greater, a unaccounted for NFC device is determined in block 420, and the PTU goes to a latch fault state. Other cases including that of an NFC tag placed on the back of a A4WP compliant device will be detected and protected according to the inventive method.

There may be an NFC Flag in the BLE registration from the PRU. The PRU static parameter field contains one bit (shown in the table of FIG. 5 as bit 7) that indicates whether the PRU is aware of an NFC implementation in it. This bit does not mean that the PRU is declaring that the NFC is protected from A4WP charging field by design, but it may be used in the inventive method to determine whether a NFC UID seen associated with a phone (i.e., BLE MAC address) is due to a "designed in" or original NFC feature, in which case the bit would be set, or was a "add on" by the user, in which case the bit would not be set.

In the future, it is conceivable that a certification regime in place either at the A4WP or the NFC Forum or jointly may provide for a mechanism to test and guarantee that an A4WP device with an NFC Flag set to 1 is indeed safe to charge. Even without that, as long as the bit indicates NFC awareness, the inventive method will work. In anticipation of such an evolution, this disclosure presents the truth table above (FIG. 3) that makes decisions on whether to continue charging a first device, when a second device is introduced, for various combinations of devices. These devices include tags, phones with NFC, phones with A4WP and combinations thereof. In some scenarios, it might not be possible to ensure that all PRU manufacturers implement an NFC aware bit. In these scenarios, a phone with an NFC sticker slapped onto the back of an A4WP device (either built-in or added on) would continue to be charged. This might not be desirable, but the risk might be acceptable under certain conditions, and these scenarios are mentioned herein for the sake of completeness.

The truth table of FIG. 3 is realized for charging/no charging when a new device is introduced under various initial conditions. It is assumed that an NFC aware bit (as mandated in the A4WP standard) is not available for use due to uneven implementation of the standard in the ecosystem.

Another type of behavior might be that shown in FIG. 6. Information about whether the mat was previous charging may be leveraged to make a decision about charging additional devices. In this case the approach is more conservative in that a phone with NFC in it is not charged if the PTU can see the NFC (i.e., an unshielded case). While this might be intrusive to the user, to limit liability, such an approach may be adopted with a user prompt to confirm an override and ensure that the device can be charged.

Figure 7A:
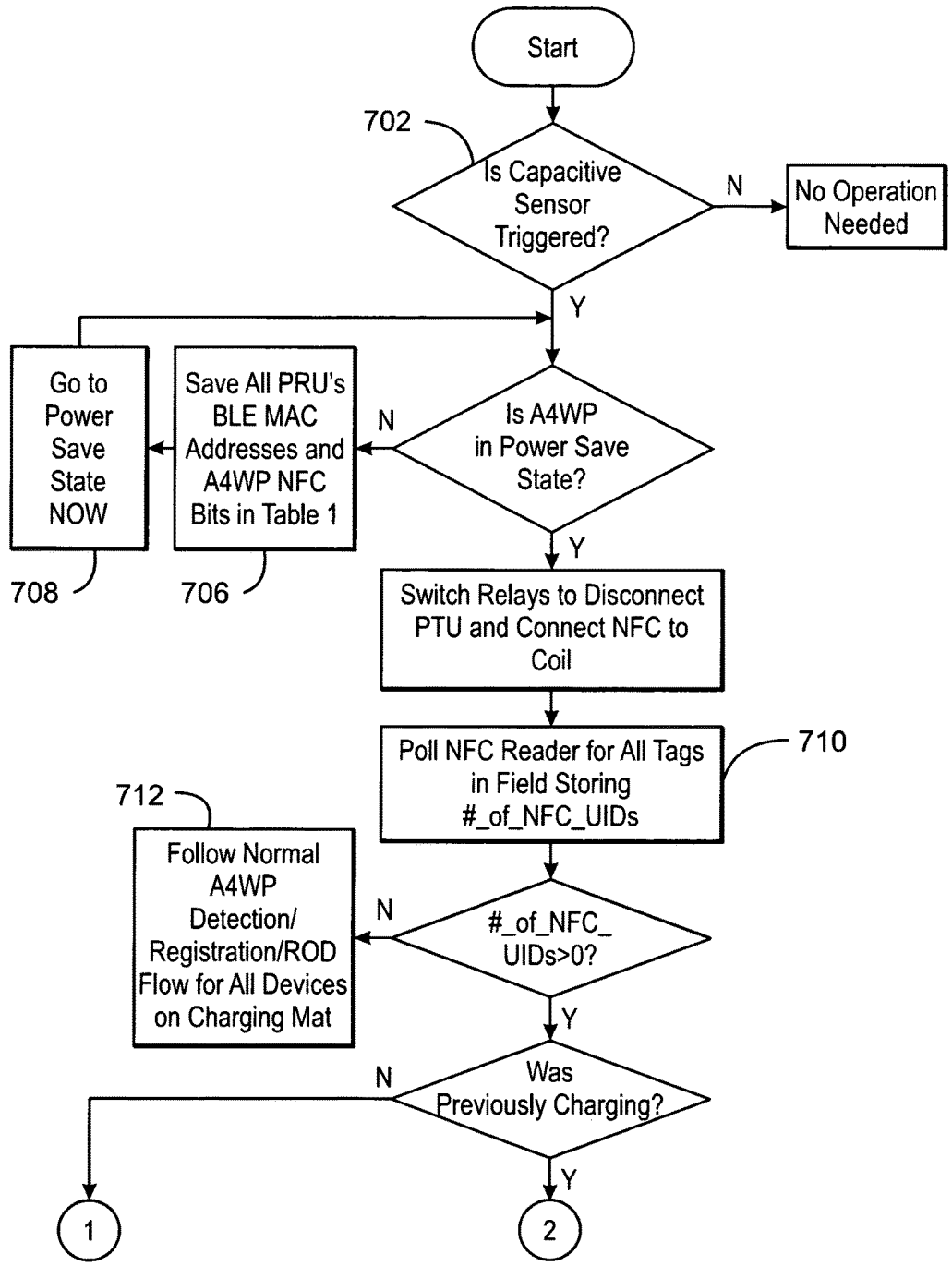
FIGS. 7A, 7B, and 7C show a flowchart combining Rod Object Detection with sensors and NFC reader to realize the truth table shown FIG. 6.
Figure 7B:
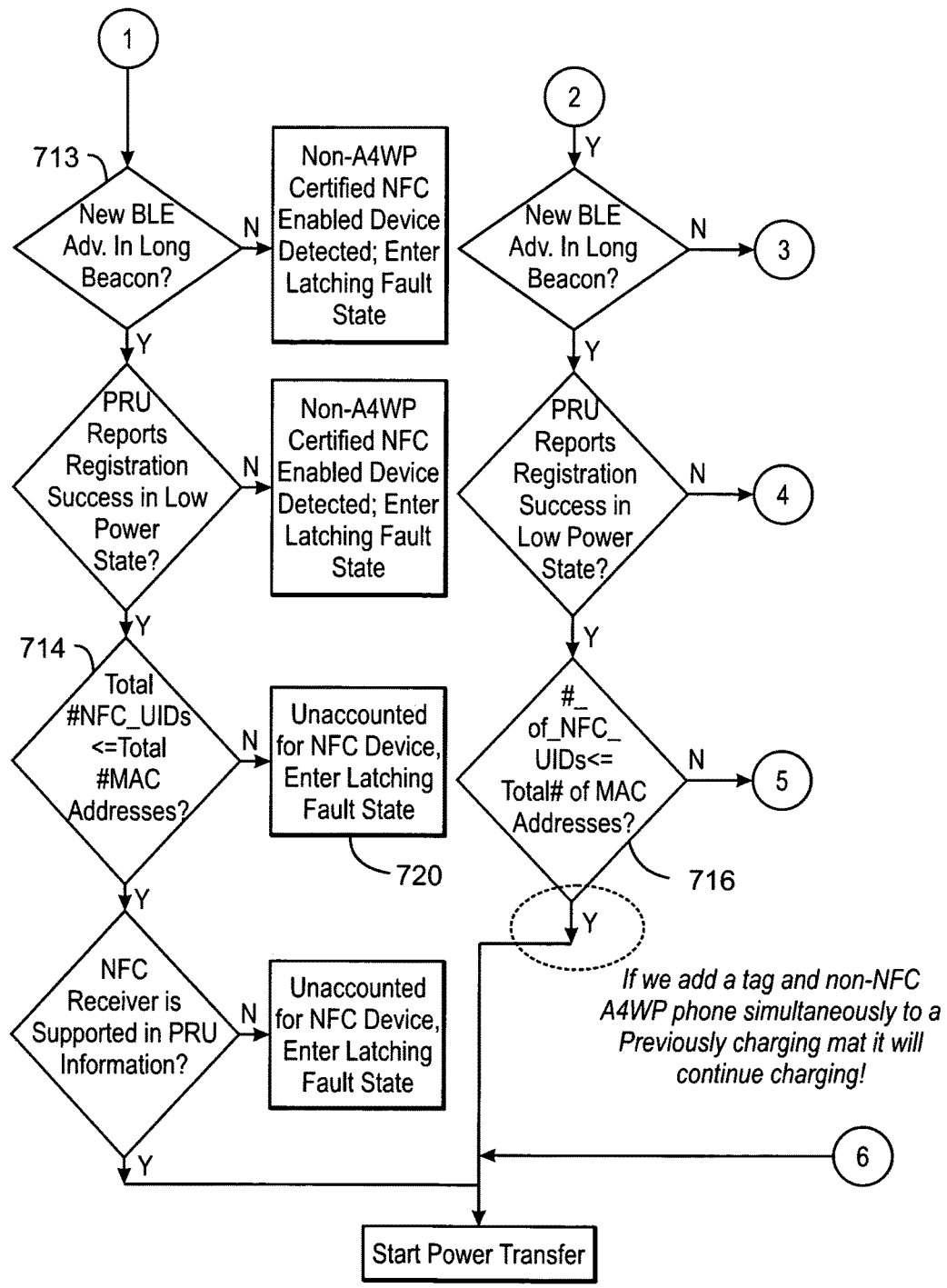
Figure 7C:
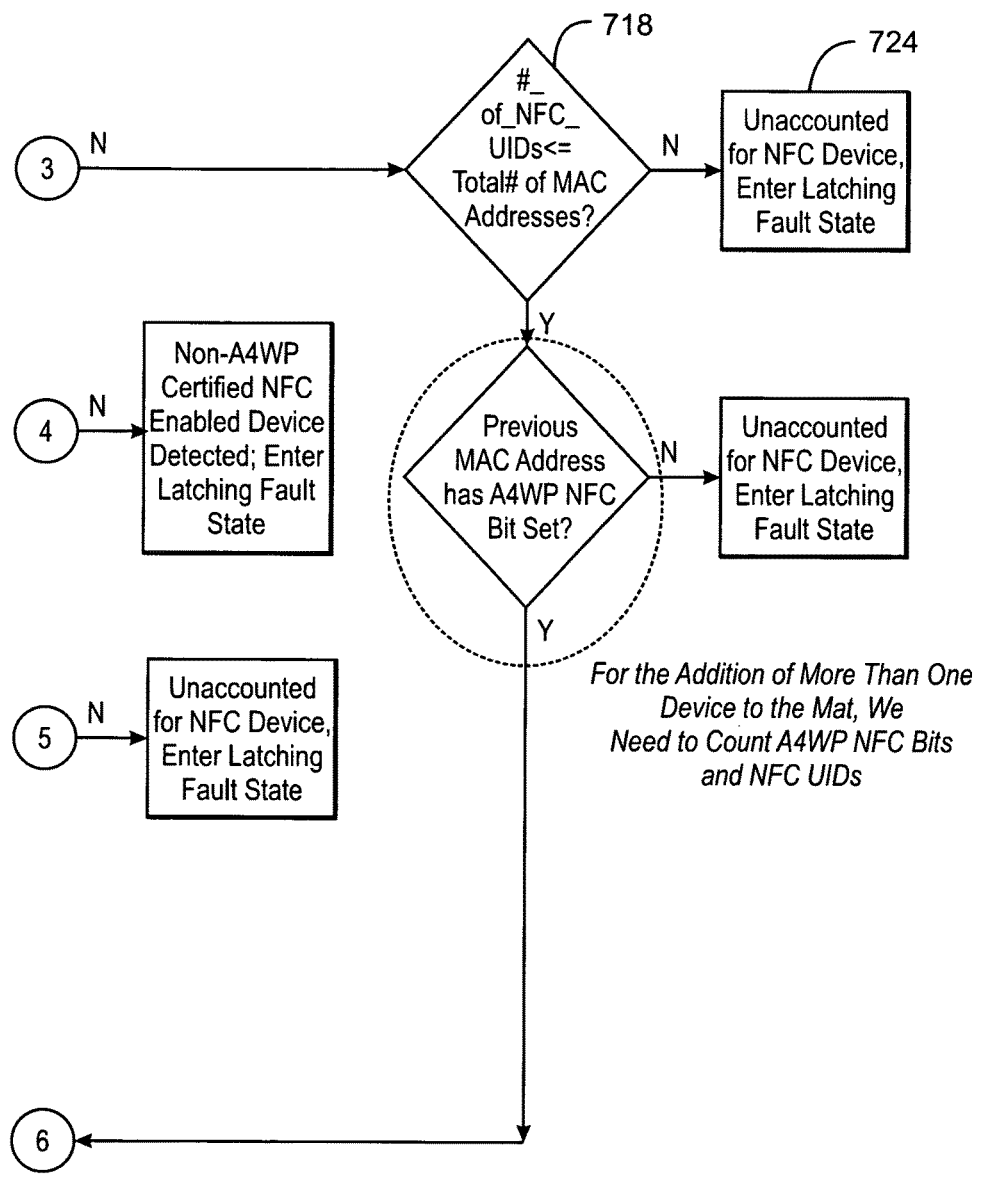

FIG. 7 is a flowchart of a method 700 combining Rod Object Detection with sensors and an NFC reader to realize the truth table shown in FIG. 6. As soon as a user places an NFC tag near the charging mat, the capacitive sensor is triggered in block 702. If it is determined in block 704 that the PTU is in power transfer state (and not the power save state), the PTU saves all PRU's MAC addresses and A4WP NFC aware bits (block 706) and then may immediately go to power save state (block 708). If the A4WP mat is now in power save state then a long beacon is sent to measure the impedance baseline. Subsequently, the NFC reader is activated to poll (block 710). If a valid NFC response is retrieved AND the ROD (Rogue Object Detection) algorithm is NOT able to discern any impedance change, then the presence of an NFC tag is detected. A tally of the number of Unique IDs obtained during polling is maintained and is used to distinguish between phones and tags. (Tags present such a small perturbation of the impedance baseline that they go undetected using the ROD algorithm alone). If there is no NFC response, then the object is passed to normal A4WP ROD algorithm (block 712) and a decision to handle can be made based on the decision boundary of the ROD algorithm.

If a user places an A4WP compliant phone with protected built-in NFC near the charging mat, the capacitive sensor triggers as described above with reference to FIG. 7. However, in this case the ROD impedance baseline is perturbed enough for a positive detection. Now, the NFC polling also determines the presence of an NFC enabled device or tag on the mat. The algorithm looks for a new BLE MAC address in a valid BLE advertisement from a PRU (block 713), i.e., with the BLE MAC address different from those BLE addresses saved right before baseline measurement. Positive detection confirms that one more phone or tablet is present. It remains to be determined if the NFC seen is a user add on or built-in (and hence protected). This is achieved by first comparing the number of BLE MAC addresses stored in the PTU with the number of NFC unique IDs also seen by the PTU. If more NFC tags than BLE MAC addresses are seen, as determined in blocks 714, 716 and 718, then the presence of unprotected or unaccounted for NFC tags is detected in blocks 720, 722 and 724. If, however, the number of IDs match up, then the next operation is to try to register based on the BLE advertisement. If successful, then an A4WP compliant device is confirmed. Also, during successful registration, one bit is reserved to indicate whether NFC is present. If this bit is set, it indicates that the phone is aware of the presence of NFC. If the flag is not set, then we know that a user stuck an NFC tag onto the phone case and charging can be stopped.

With regard to timing, in each case, the decisions indicated in the flow chart of FIG. 7 may be completed before an amount of time has elapsed that could potentially result in tag damage, which may be a couple of seconds for the most susceptible tags, or a few minutes for newer interface tags. Taking into account the amount of time for the PRU to register and for the MCU to make decisions, the algorithms can run through most scenarios before any tag damage can be caused. FIG. 8 is a table providing approximate time durations to perform some operations of method 700.

Figure 9A:
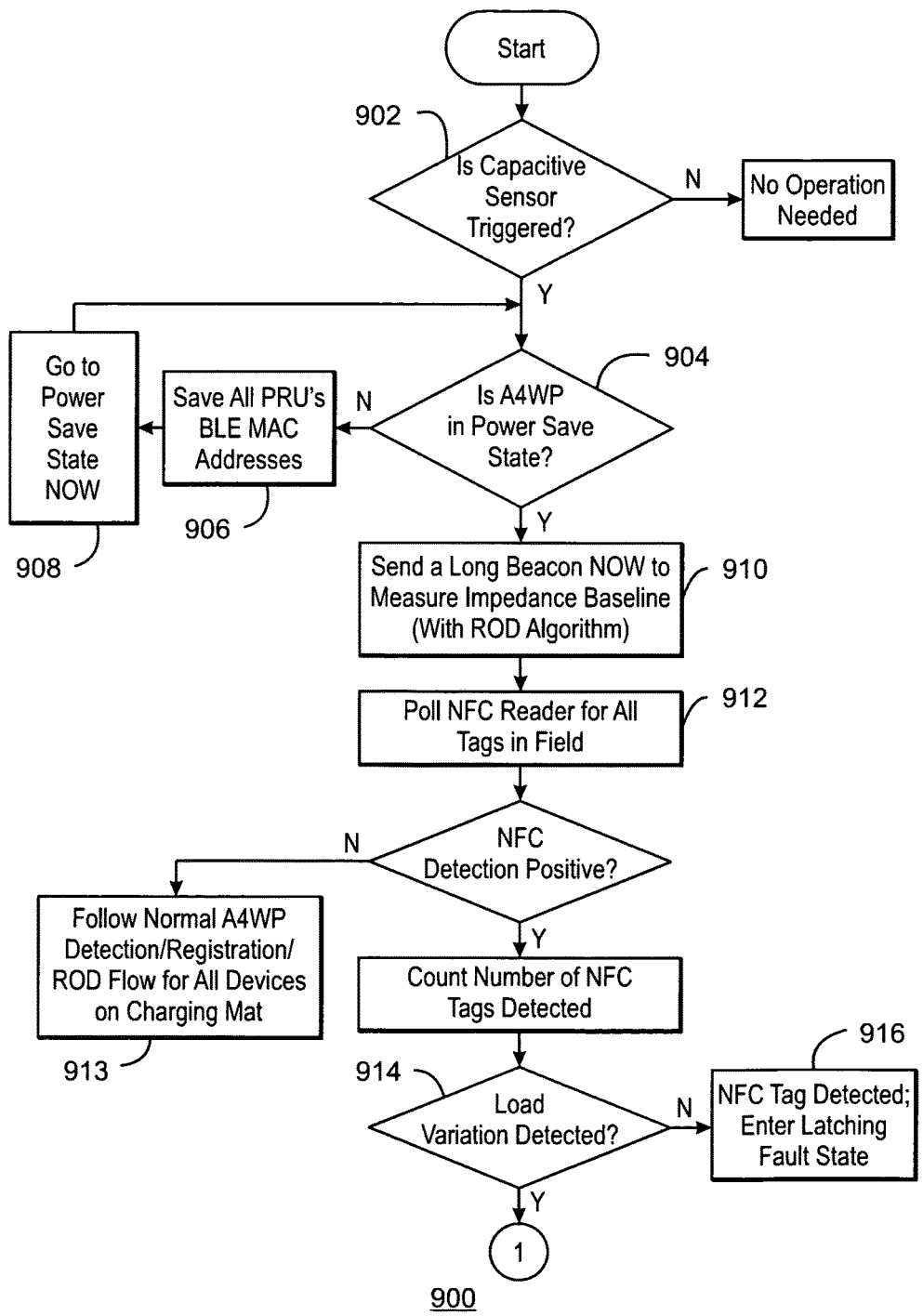
FIGS. 9A and 9B show a flowchart of A4WP PTU behavior according to another embodiment of the present disclosure.
Figure 9B:
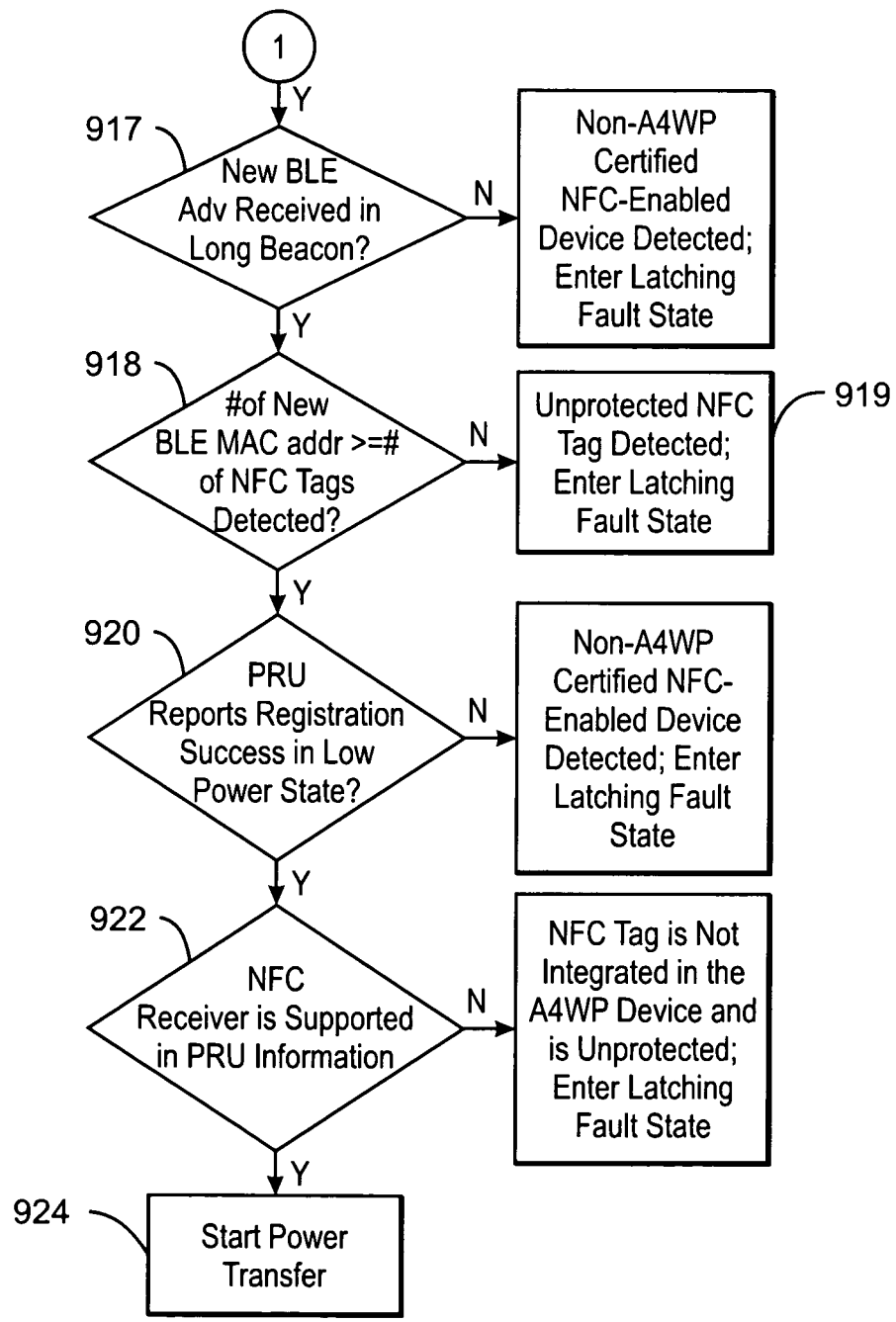

FIGS. 9A-B is a flowchart of a protection scheme 900 to realize the truth table shown in FIG. 10. The protection scheme may represent a logical AND of five conditions after NFC UID is detected. As soon as a user places an NFC tag near the charging mat, the capacitive sensor is triggered in block 902. If it is determined in block 904 that the PTU is in power transfer state (and not the power save state), the PTU saves all PRU's MAC addresses (block 906) and then may immediately go to power save state (block 908). If the A4WP mat is now in power save state then a long beacon is sent to measure the impedance baseline (block 910). Subsequently, the NFC reader is activated to poll (block 912). If a load variation is not detected in block 914, then the presence of an NFC tag is detected in block 916. A tally of the number of Unique IDs obtained during polling is maintained and is used to distinguish between phones and tags. (Tags present such a small perturbation of the impedance baseline that they go undetected using the ROD algorithm alone). If there is no NFC response, then the object is passed to normal A4WP ROD algorithm (block 913) and a decision to handle can be made based on the decision boundary of the ROD algorithm.

If a user places an A4WP compliant phone with protected built-in NFC near the charging mat, the capacitive sensor triggers as described above with reference to FIG. 7. However, in this case the ROD impedance baseline is perturbed enough for a positive detection. Now, the NFC polling also determines the presence of an NFC enabled device or tag on the mat. The algorithm looks for a new BLE MAC address in a valid BLE advertisement from a PRU (block 917), i.e., with the BLE MAC address different from those BLE addresses saved right before baseline measurement. Positive detection confirms that one more phone or tablet is present. It remains to be determined if the NFC seen is a user add on or built-in (and hence protected). This is achieved by first comparing the number of BLE MAC addresses stored in the PTU with the number of NFC unique IDs also seen by the PTU. If more NFC tags than BLE MAC addresses are seen, as determined in block 918, then the presence of an unprotected NFC tag is detected in block 919. If, however, the number of IDs match up, then it is determined in block 920 whether the PRU reports registration success in low power state. If so, and if the NFC receiver is supported in PRU information (block 922), then power transfer is begun in block 924.

FIG. 10 is a truth table illustrating whether charging or no-charging should be performed for various scenarios of devices being introduced into an existing charging session according to the method of FIG. 9.

Figure 11A:
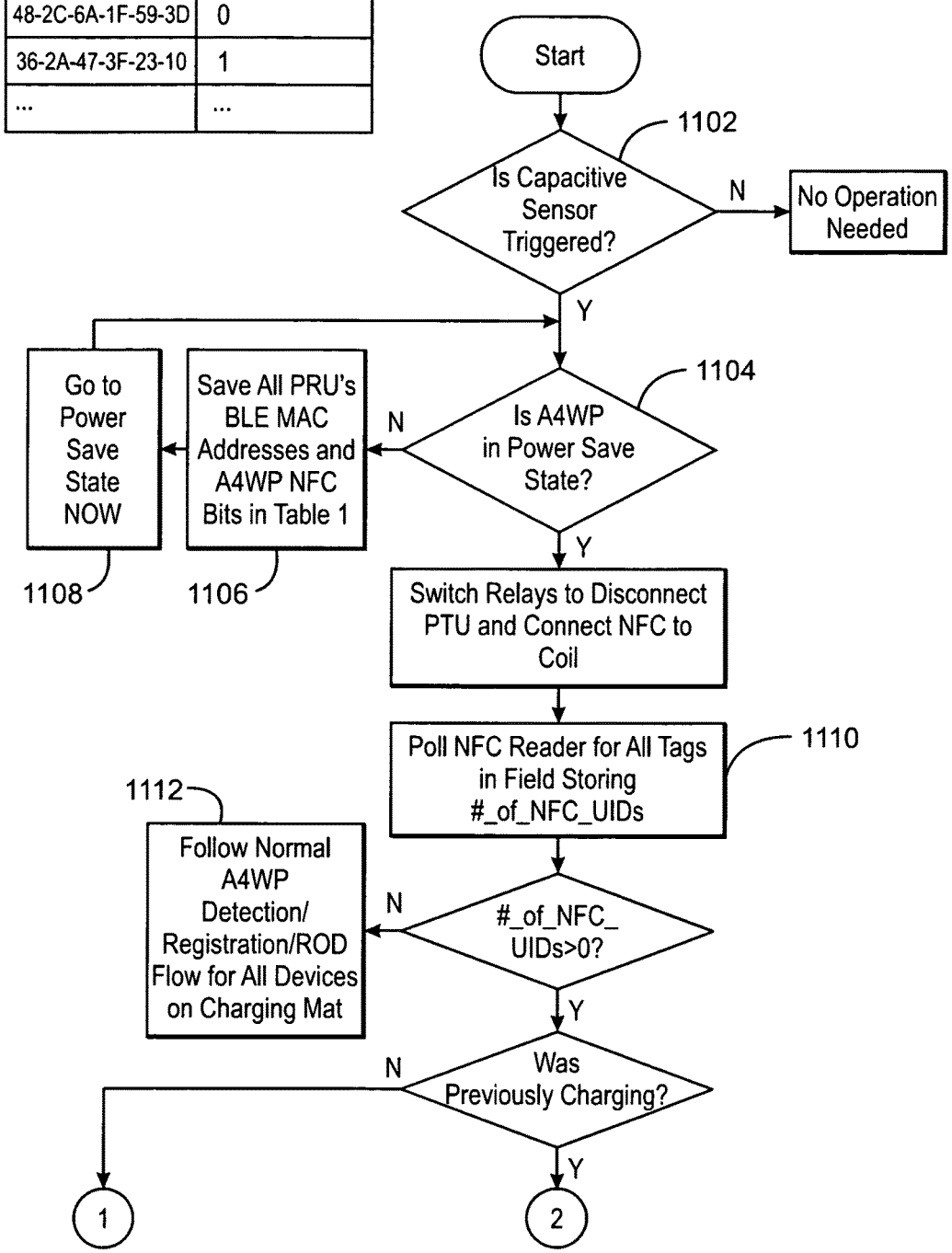
FIGS. 11A, 11B, and 11C show a flowchart of A4WP PTU behavior according to yet another embodiment of the present disclosure.
Figure 11B:
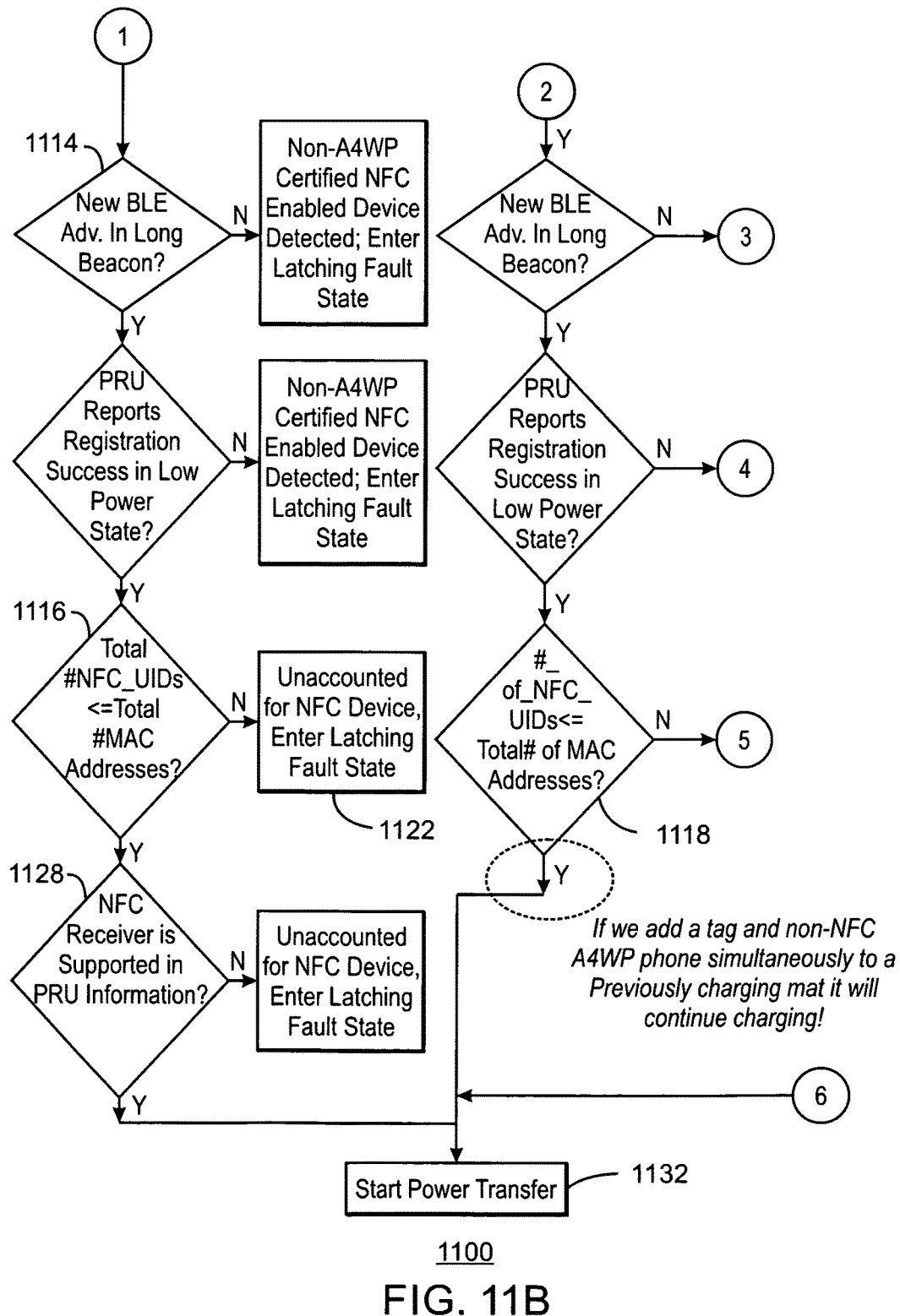
Figure 11C:
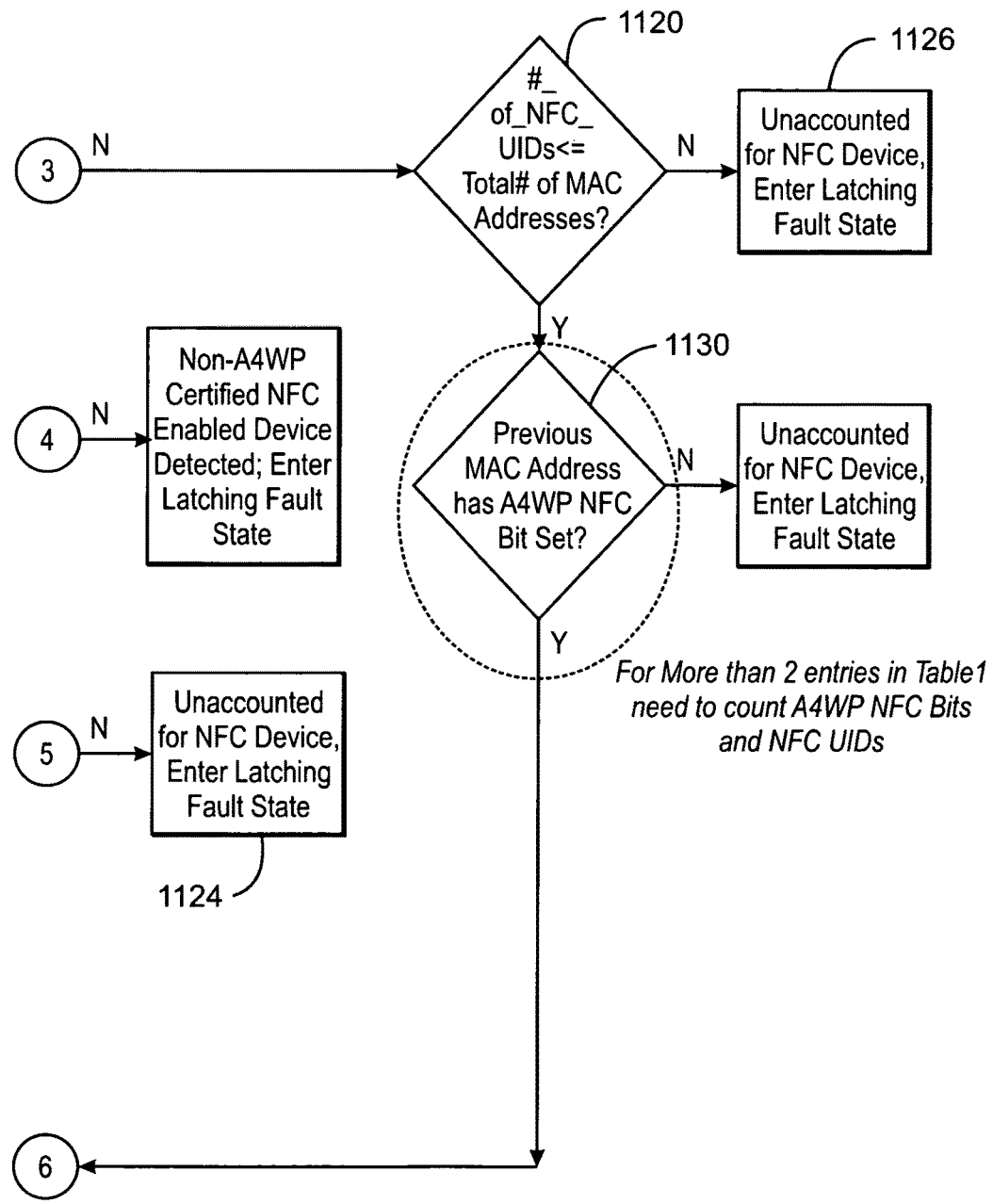

FIGS. 11A-C is a flowchart of a protection scheme 1100 to realize the truth table shown in FIG. 12. Scheme 1100 may leverage information about whether the mat was previously charging in making a decision about whether to charge additional devices. Scheme 1100 may be an iteration on scheme 900 of FIGS. 9A-B. As soon as a user places an NFC tag near the charging mat, the capacitive sensor is triggered in block 1102. If it is determined in block 1104 that the PTU is in power transfer state (and not the power save state), the PTU saves all PRU's MAC addresses and A4WP NFC aware bits (block 1106) and then may immediately go to power save state (block 1108). Subsequently, the NFC reader is activated to poll (block 1110). A tally of the number of Unique IDs obtained during polling is maintained and is used to distinguish between phones and tags. (Tags present such a small perturbation of the impedance baseline that they go undetected using the ROD algorithm alone). If there is no NFC response, then the object is passed to normal A4WP ROD algorithm (block 1112) and a decision to handle can be made based on the decision boundary of the ROD algorithm.

The algorithm looks for a new BLE MAC address in a valid BLE advertisement from a PRU (block 1114), i.e., with the BLE MAC address different from those BLE addresses saved right before baseline measurement. Positive detection confirms that one more phone or tablet is present. It remains to be determined if the NFC seen is a user add on or built-in (and hence protected). This is achieved by first comparing the number of BLE MAC addresses stored in the PTU with the number of NFC unique IDs also seen by the PTU. If more NFC tags than BLE MAC addresses are seen, as determined in blocks 1116, 1118 and 1120, then the presence of unaccounted for NFC tags is detected in blocks 1122, 1124 and 1126. If, however, the number of IDs match up, then it may be determined in blocks 1128 and 1130 whether the MAC address has an A4WP NFC bit set. If so, then power transfer is commenced in block 1132.

FIG. 12 is a truth table illustrating whether charging or no-charging should be performed for various scenarios of devices being introduced into an existing charging session according to the method of FIG. 11.

FIG. 13 is a flowchart of a method 1300 without an A4WP NFC bit to realize the truth table shown in FIG. 14. Method 1300 may be appropriate for use in the absence of the A4WP NFC bit. As soon as a user places an NFC tag near the charging mat, the capacitive sensor is triggered in block 1302. If it is determined in block 1304 that the PTU is in power transfer state (and not the power save state), the PTU saves all PRU's MAC addresses and A4WP NFC aware bits (block 1306) and then may immediately go to power save state (block 1308). If the A4WP mat is now in power save state then a long beacon is sent to measure the impedance baseline. Subsequently, the NFC reader is activated to poll (block 1310). If a valid NFC response is retrieved AND the ROD (Rogue Object Detection) algorithm is NOT able to discern any impedance change, then the presence of an NFC tag is detected. A tally of the number of Unique IDs obtained during polling is maintained and is used to distinguish between phones and tags. (Tags present such a small perturbation of the impedance baseline that they go undetected using the ROD algorithm alone). If there is no NFC response, then the object is passed to normal A4WP ROD algorithm (block 1312) and a decision to handle can be made based on the decision boundary of the ROD algorithm.

If a user places an A4WP compliant phone with protected built-in NFC near the charging mat, the capacitive sensor trigger as described above with reference to FIG. 7. However, in this case the ROD impedance baseline is perturbed enough for a positive detection. Now, the NFC polling also determines the presence of an NFC enabled device or tag on the mat. The algorithm looks for a new BLE MAC address in a valid BLE advertisement from a PRU (block 1314), i.e., with the BLE MAC address different from those BLE addresses saved right before baseline measurement. Positive detection confirms that one more phone or tablet is present. It remains to be determined if the NFC seen is a user add on or built-in (and hence protected). This is achieved by first comparing the number of BLE MAC addresses stored in the PTU with the number of NFC unique IDs also seen by the PTU. If more NFC tags than BLE MAC addresses are seen, as determined in blocks 1316, 1318 and 1320, then the presence of unprotected or unaccounted for NFC tags is detected in blocks 1322, 1324 and 1326. If, however, the number of IDs match up, then power transfer may begin in block 1328.

Figure 13A:
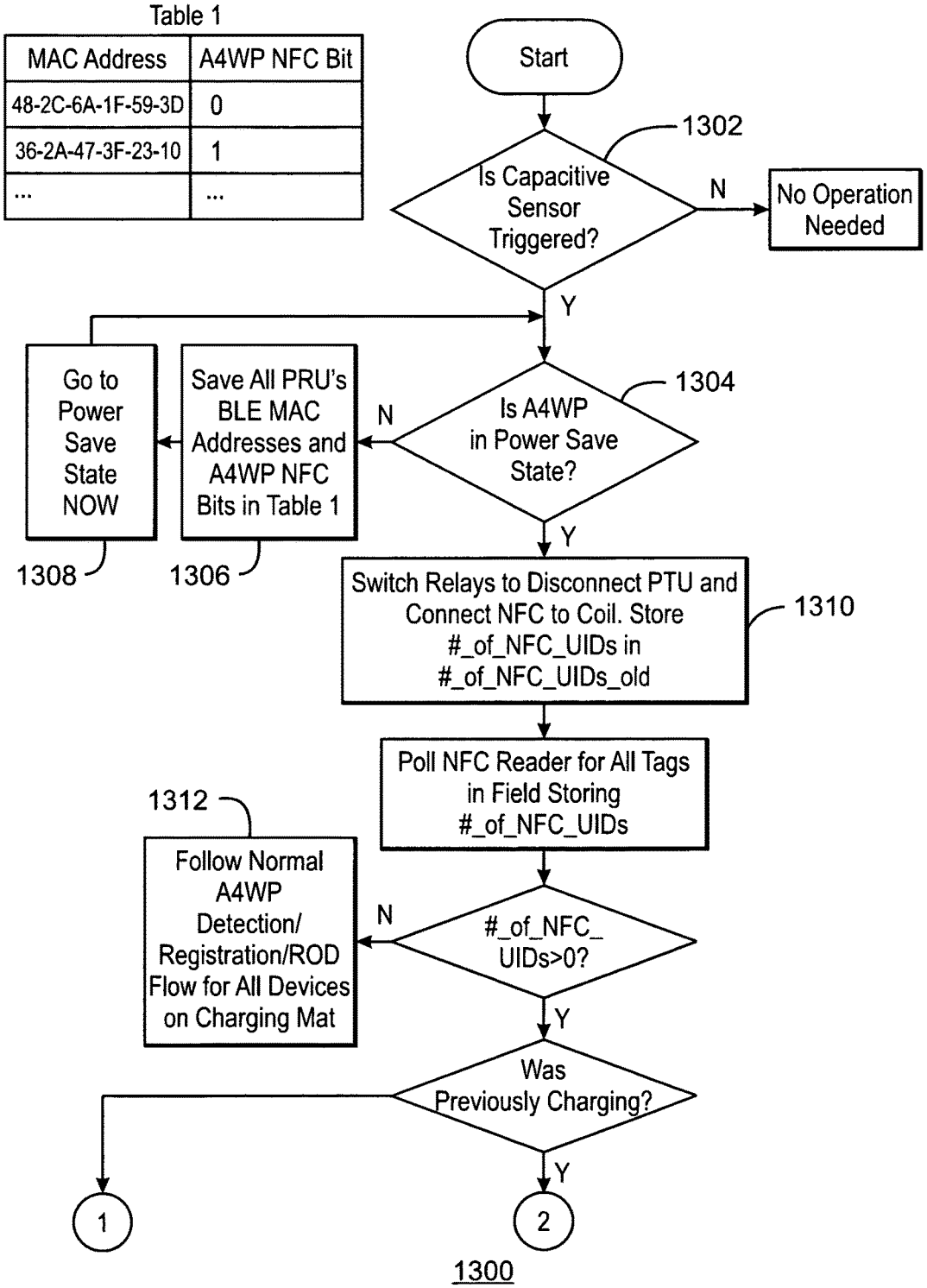
FIGS. 13A, 13B, and 13C show a flowchart of A4WP PTU behavior according to still another embodiment of the present disclosure wherein there is no A4WP NFC bit.
Figure 13B:
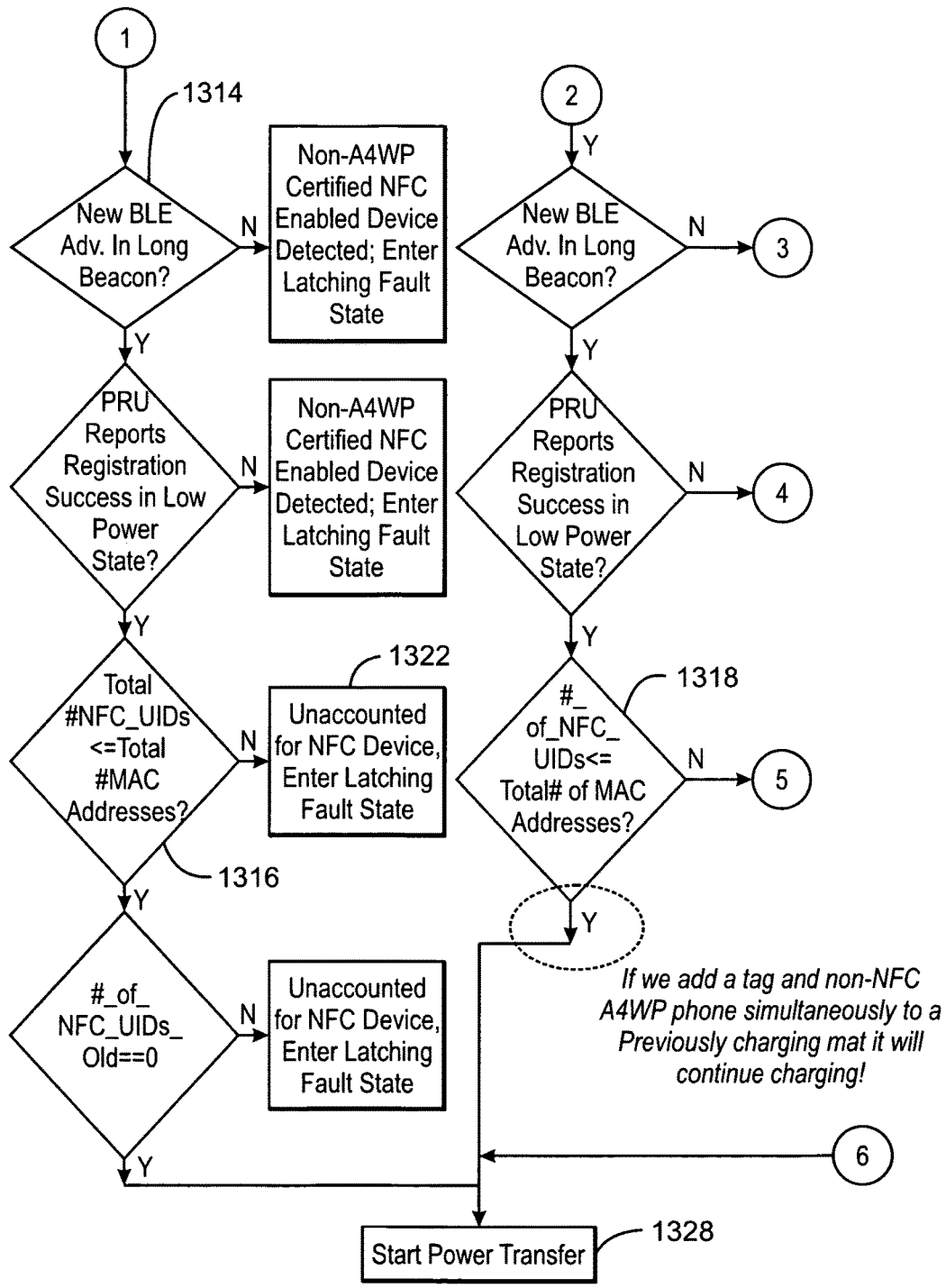
Figure 13C:
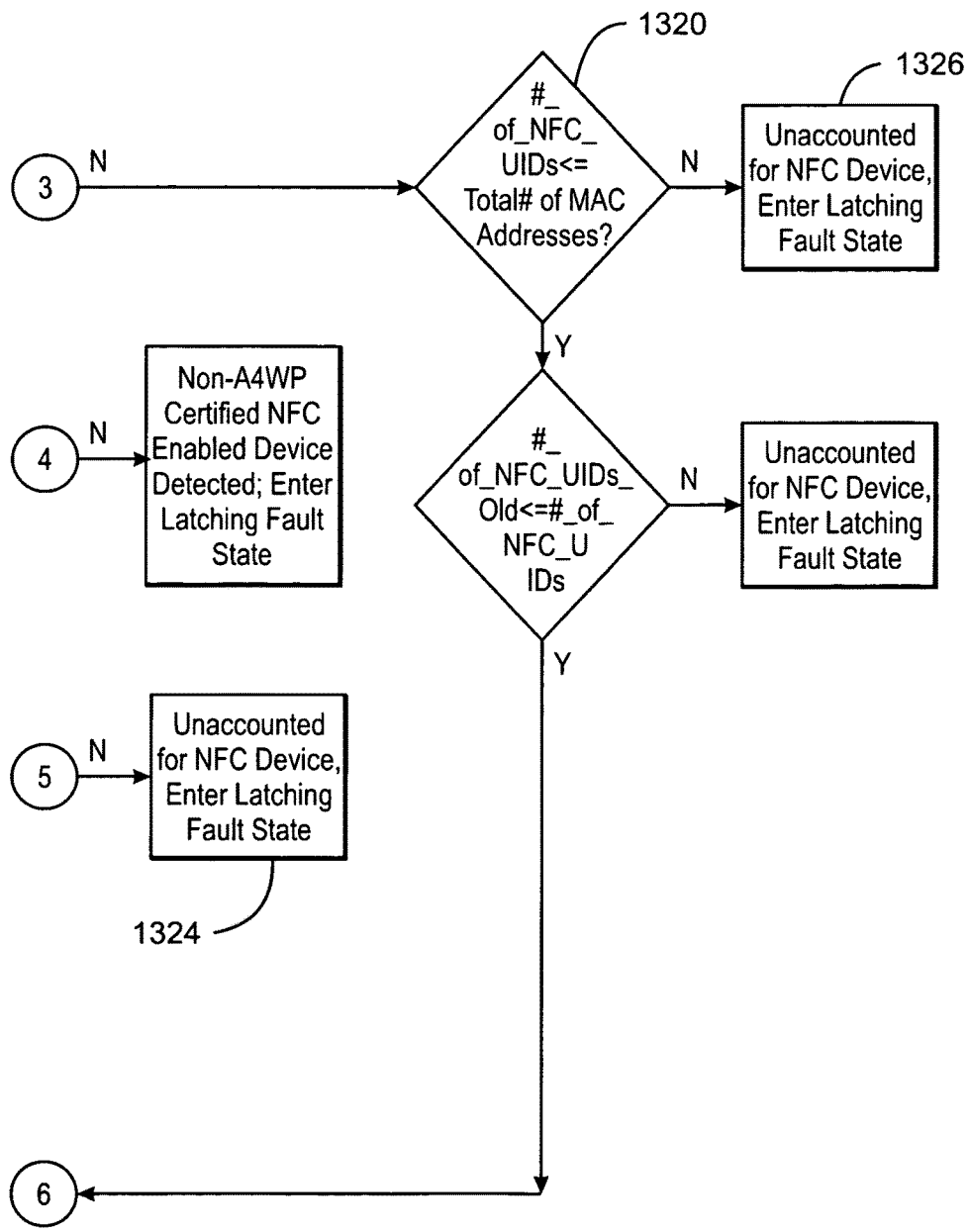

With regard to timing, in each case, the decisions indicated in the flow chart of FIGS. 13A-C may be completed before an amount of time has elapsed that could potentially result in tag damage, which may be a couple of seconds for the most susceptible tags, or a few minutes for newer interface tags, such as AMSSL13-A. Taking into account the amount of time for the PRU to register and for the MCU to make decisions, the algorithms can run through most scenarios before an amount of time has elapsed that could potentially result in tag damage.

FIG. 14 is a truth table illustrating whether charging or no-charging should be performed for various scenarios of devices being introduced into an existing charging session according to the method of FIG. 13.

Figure 15A:
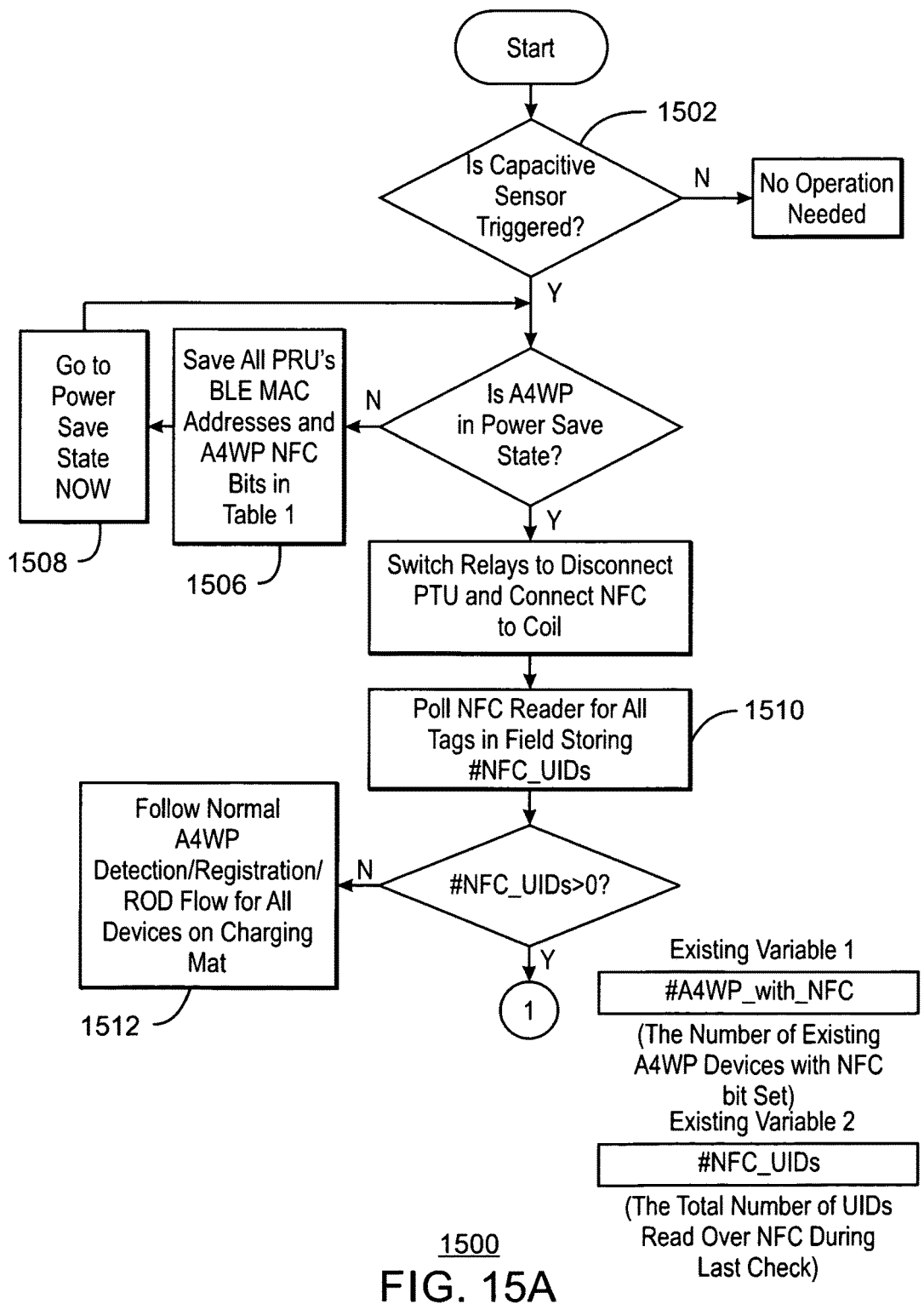
FIGS. 15A and 15B show a flowchart of A4WP PTU behavior according to a further embodiment of the present disclosure wherein there is an A4WP NFC bit.
Figure 15B:
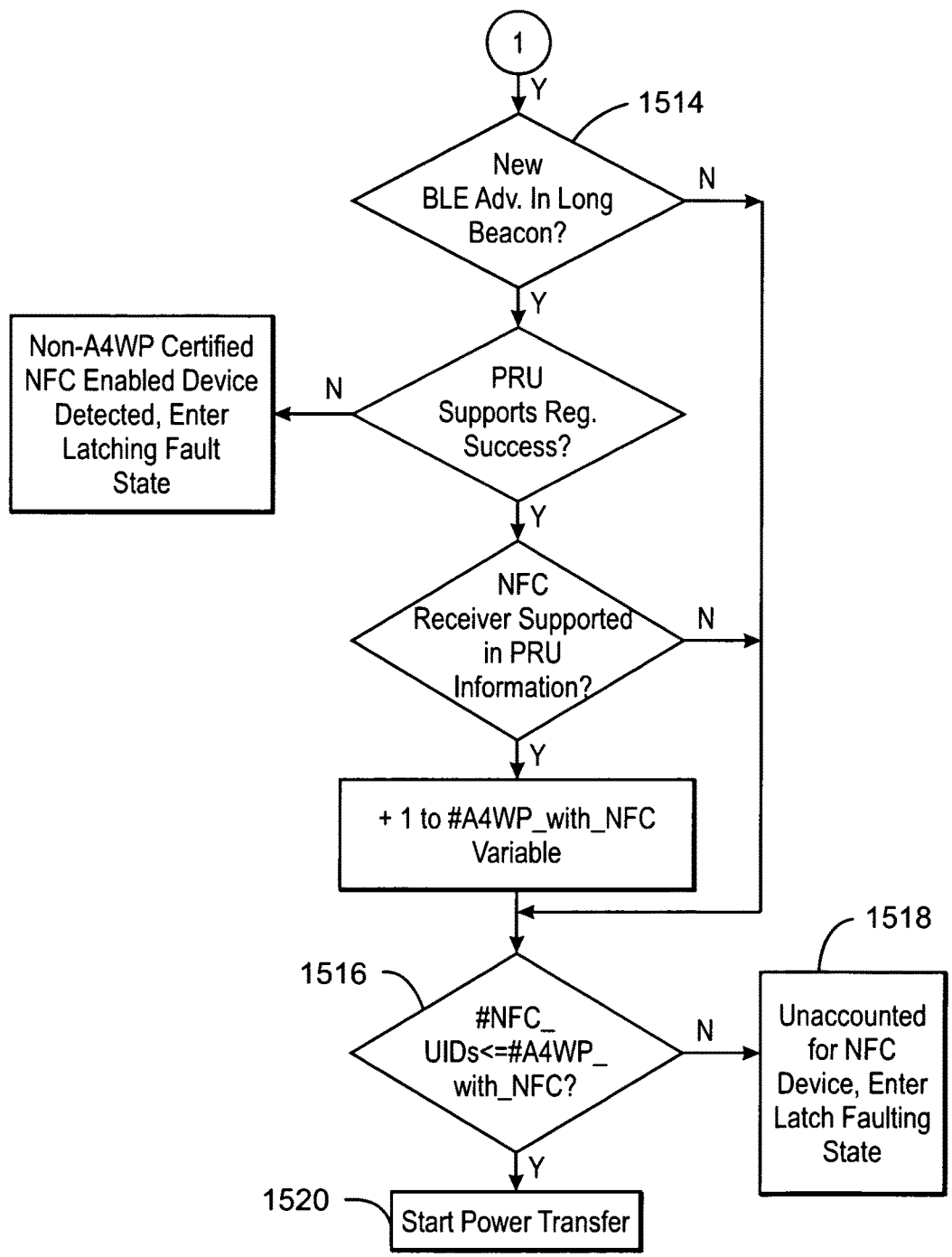

FIG. 15 is a flowchart of a method 1500 with an A4WP NFC bit to realize the truth table shown in FIG. 16. Method 1500 may keep an account of the number of NFC UIDs and A4WP devices which have NFC UIDs in order to determine whether there are any orphan UIDs corresponding to tags.

As soon as a user places an NFC tag near the charging mat, the capacitive sensor is triggered in block 1502. If it is determined in block 1504 that the PTU is in power transfer state (and not the power save state), the PTU saves all PRU's MAC addresses and A4WP NFC aware bits (block 1506) and then may immediately go to power save state (block 1508). If the A4WP mat is now in power save state then a long beacon is sent to measure the impedance baseline.

Subsequently, the NFC reader is activated to poll (block 1510). If a valid NFC response is retrieved AND the ROD (Rogue Object Detection) algorithm is NOT able to discern any impedance change, then the presence of an NFC tag is detected. A tally of the number of Unique IDs obtained during polling is maintained and is used to distinguish between phones and tags. (Tags present such a small perturbation of the impedance baseline that they go undetected using the ROD algorithm alone). If there is no NFC response, then the object is passed to normal A4WP ROD algorithm (block 1512) and a decision to handle can be made based on the decision boundary of the ROD algorithm.

If a user places an A4WP compliant phone with protected built-in NFC near the charging mat, the capacitive sensor trigger as described above with reference to FIG. 7. However, in this case the ROD impedance baseline is perturbed enough for a positive detection. Now, the NFC polling also determines the presence of an NFC enabled device or tag on the mat. The algorithm looks for a new BLE MAC address in a valid BLE advertisement from a PRU (block 1514), i.e., with the BLE MAC address different from those BLE addresses saved right before baseline measurement. Positive detection confirms that one more phone or tablet is present. It remains to be determined if the NFC seen is a user add on or built-in (and hence protected). This is achieved by first comparing the number of A4WP devices having NFC to the number of NFC unique IDs also seen by the PTU. If more NFC tags than A4WP devices having NFC are seen, as determined in block 1516, then the presence of unprotected or unaccounted for NFC tags is detected in block 1518. If, however, the number of IDs match up, then the next operation is to begin power transfer in block 1520.

With regard to timing, in each case, the decisions indicated in the flow chart of FIG. 15 may be completed before an amount of time has elapsed that could potentially result in tag damage, which may be a couple of seconds for the most susceptible tags, or a few minutes for newer interface tags, such as AMSSL13-A. Taking into account the amount of time for the PRU to register and for the MCU to make decisions, the algorithms can run through most scenarios before any tag damage can be caused.

FIG. 16 is a truth table illustrating whether charging or no-charging should be performed for various scenarios of devices being introduced into an existing charging session according to the method of FIG. 15.

FIG. 17 is a truth table similar to FIG. 3 except that a phone with NFC does not necessarily prevent charging. Telephones with NFC may not present an issue, and thus charging may occur despite the presence of a phone with NFC.

The disclosure may provide a safe wireless charging ecosystem, with PTUs that are compatible with existing ecosystem of NFC tags and non-A4WP compliant phones. The protection of NFC devices when placed on A4WP charging mats is achieved, with support for multiple PRUs. In addition, the present disclosure presents a method of protecting NFC phones and tags that is fully compliant with regulatory restrictions around the world.

The disclosure employs standard components (e.g., capacitive sensors, NFC readers, etc.), enabling multisourcing of components and promoting a robust ecosystem of mat suppliers for PTUs. As such, each of the components can be interchanged with similar components from other manufacturers, allowing for multi-sourcing.

EXAMPLES

Example 1 is a method of wirelessly charging batteries of devices. The method includes detecting two devices being simultaneously present on a charging mat; determining, for each of the two devices, whether the device is A4WP compatible; determining, for each of the two devices, whether the device is NFC enabled; and charging the devices if at least one of the two devices is A4WP compatible, and neither device is NFC enabled without being A4WP compatible.

Example 2 includes the method of example 1, including or excluding optional features. In this example, the detecting two devices includes using a capacitive sensor.

Example 3 includes the method of any one of examples 1 to 2, including or excluding optional features. In this example, the detecting two devices includes using a capacitive sensor to sense a change in capacitance associated with a grounded body placing one of the two devices onto the charging mat.

Example 4 includes the method of any one of examples 1 to 3, including or excluding optional features. In this example, the detecting two devices includes measuring a change in charging impedance due to one of the two devices being introduced onto the charging mat.

Example 5 includes the method of any one of examples 1 to 4, including or excluding optional features. In this example, determining, for each of the two devices, whether the device is NFC enabled includes using an NFC reader to ascertain that a NFC standard compliant device has been placed on the charging mat.

Example 6 includes the method of any one of examples 1 to 5, including or excluding optional features. In this example, the determining, for each of the two devices, whether the device is A4WP compatible includes receiving an A4WP standard compliant response from an A4WP compliant receiver. Optionally, the determining, for each of the two devices, whether the device is NFC enabled includes reading a bit in the A4WP standard compliant response that indicates existence of NFC in the device. Optionally, the A4WP standard compliant response is a Bluetooth low energy response.

Example 7 includes the method of any one of examples 1 to 6, including or excluding optional features. In this example, each of the devices is a telephone, an NFC tag, a tablet computer, a wearable device, and/or a laptop computer.

Example 8 is a system for wirelessly charging batteries of devices. The system includes a transmission coil wirelessly transmitting electrical current to a first device present on a charging mat; a capacitive sensor detecting a second device being moved toward the charging mat while the first device is on the charging mat; a wireless communication device receiving signals from each of the first device and the second device, the signals indicating whether the device is A4WP compatible; an NFC reader determining, for each of the first device and the second device, whether the device is NFC enabled; and an electronic processor communicatively coupled to each of the transmission coil, the capacitive sensor, the wireless communication device, and the NFC reader, the electronic processor enabling the transmission coil to charge the devices if: at least one of the first device and the second device is A4WP compatible; the first device is not NFC enabled; and the second device is not NFC enabled without being A4WP compatible.

Example 9 includes the system of example 8, including or excluding optional features. In this example, the capacitive sensor detects a change in capacitance associated with a grounded body placing the second device onto the charging mat. Optionally, a sensing range of the capacitive sensor is greater than a reading range of an NFC tag, and the reading range of an NFC tag is greater than a distance from the charging mat at which an NFC tag is damaged during charging.

Example 10 includes the system of any one of examples 8 to 9, including or excluding optional features. In this example, the system includes a current sensor detecting a change in charging impedance due to the second device being introduced onto the charging mat.

Example 11 includes the system of any one of examples 8 to 10, including or excluding optional features. In this example, the NFC reader ascertains that a NFC standard compliant device has been placed on the charging mat.

Example 12 includes the system of any one of examples 8 to 11, including or excluding optional features. In this example, the wireless communication device receives an A4WP standard compliant response from an A4WP compliant receiver. Optionally, the NFC reader reads a bit in the A4WP standard compliant response that indicates existence of NFC in the device. Optionally, the A4WP standard compliant response is a Bluetooth low energy response.

Example 13 includes the system of any one of examples 8 to 12, including or excluding optional features. In this example, each of the first device and the second device is a telephone, an NFC tag, a tablet computer, and/or a laptop computer.

Example 14 is a non-transitory computer-readable medium that includes instructions that control a processor. The computer-readable medium includes instructions that control the processor to detect a first device being present on a charging mat; detect a second device being moved toward the charging mat while the first device is on the charging mat; determine, for each of the two devices, whether the device is A4WP compatible; determine, for each of the two devices, whether the device is NFC enabled; and charge the devices if: neither of the two devices is A4WP compatible with an NFC tag in its cover; at least one of the two devices is A4WP compatible; the first device does not have an NFC tag; and the second device does not have an NFC tag without being A4WP compatible.

Example 15 includes the computer-readable medium of example 14, including or excluding optional features. In this example, to detect a second device includes to use a capacitive sensor to sense a change in capacitance associated with a grounded body placing the second device onto the charging mat. Optionally, a sensing range of the capacitive sensor is greater than a reading range of an NFC tag, and the reading range of an NFC tag is greater than a distance from the charging mat at which an NFC tag is damaged during charging.

Example 16 includes the computer-readable medium of any one of examples 14 to 15, including or excluding optional features. In this example, to detect a second device being moved toward the charging mat includes to measure a change in charging impedance due to the second device being introduced onto the charging mat.

Example 17 includes the computer-readable medium of any one of examples 14 to 16, including or excluding optional features. In this example, to determine, for each of the two devices, whether the device is NFC enabled includes to use an NFC reader to ascertain that a NFC standard compliant device has been placed on the charging mat.

Example 18 includes the computer-readable medium of any one of examples 14 to 17, including or excluding optional features. In this example, to determine, for each of the first device and the second device, whether the device is A4WP compatible includes to receive an A4WP standard compliant response from an A4WP compliant receiver. Optionally, to determine, for each of the first device and the second device, whether the device is NFC enabled includes to read a bit in the A4WP standard compliant response that indicates existence of NFC in the device. Optionally, the A4WP standard compliant response is a Bluetooth low energy response.

Example 19 includes the computer-readable medium of any one of examples 14 to 18, including or excluding optional features. In this example, each of the first device and the second device is a telephone, an NFC tag, a tablet computer, and/or a laptop computer.

Example 20 is an apparatus to wirelessly transmit power. The apparatus includes means for detecting two devices being simultaneously present on a charging mat; means for determining, for each of the two devices, whether the device is A4WP compatible; means for determining, for each of the two devices, whether the device is NFC enabled; and means for charging the devices if at least one of the two devices is A4WP compatible, and neither device is NFC enabled without being A4WP compatible.

Example 21 includes the apparatus of example 20, including or excluding optional features. In this example, the means for detecting two devices includes a capacitive sensor.

Example 22 includes the apparatus of any one of examples 20 to 21, including or excluding optional features. In this example, the means for detecting two devices includes a capacitive sensor to sense a change in capacitance associated with a grounded body placing one of the two devices onto the charging mat.

Example 23 includes the apparatus of any one of examples 20 to 22, including or excluding optional features. In this example, the means for detecting two devices includes means for measuring a change in charging impedance due to one of the two devices being introduced onto the charging mat.

Example 24 includes the apparatus of any one of examples 20 to 23, including or excluding optional features. In this example, the means for determining, for each of the two devices, whether the device is NFC enabled includes an NFC reader to ascertain that a NFC standard compliant device has been placed on the charging mat.

Example 25 includes the apparatus of any one of examples 20 to 24, including or excluding optional features. In this example, the means for determining, for each of the two devices, whether the device is A4WP compatible includes a means for receiving an A4WP standard compliant response from an A4WP compliant receiver. Optionally, the means for determining, for each of the two devices, whether the device is NFC enabled includes a means for reading a bit in the A4WP standard compliant response that indicates existence of NFC in the device. Optionally, the A4WP standard compliant response is a Bluetooth low energy response.

Example 26 includes the apparatus of any one of examples 20 to 25, including or excluding optional features. In this example, each of the devices is a telephone, an NFC tag, a tablet computer, a wearable device, and/or a laptop computer.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of wirelessly charging batteries of devices, comprising:
   detecting a wireless power receiving device being present on a charging apparatus;
   determining that the wireless power receiving device is communicating with the charging apparatus via a first communication protocol;
   determining that a Near Field Communication (NFC) device is in communication range of the charging apparatus, wherein the NFC device is configured to communicate via a second communication protocol different from the first communication protocol;
   determining whether the NFC device is built into the wireless power receiving device based on information received from the wireless power receiving device via the first communication protocol that identifies whether the NFC device is a component of the wireless power receiving device;
   if determined that the NFC device is not built into the wireless power receiving device, mute a wireless power transfer from the charging apparatus; and
   if determined that the NFC device is built into the wireless power receiving device, enable a wireless power transfer from the charging apparatus.

2. The method of claim 1, wherein the detecting the wireless power receiving device comprises using a capacitive sensor.

3. The method of claim 1, wherein detecting the wireless power receiving device comprises using a capacitive sensor to sense a change in capacitance associated with a grounded body placing the wireless power receiving device onto the charging apparatus.

4. The method of claim 1, wherein detecting the wireless power receiving device comprises measuring a change in charging impedance due to the wireless power receiving device being introduced onto the charging apparatus.

5. The method of claim 1, wherein determining that an NFC device is in communication range of the charging apparatus comprises using an NFC reader to determine whether a NFC standard compliant device is placed on the charging apparatus.

6. The method of claim 1, wherein determining whether the NFC device is built into the wireless power receiving device comprises reading a bit in an A4WP standard compliant response that indicates existence of NFC in the device.

7. The method of claim 6, wherein the A4WP standard compliant response is compliant with a Bluetooth low energy standard.

8. The method of claim 1, wherein the wireless power receiving device is a telephone, an near field communication tag, a tablet computer, a wearable device, or a laptop computer.

9. A system for wirelessly charging batteries of devices, comprising:
   a transmission coil to wirelessly transmit electrical current to a wireless power receiving device present on a charging apparatus;
   a capacitive sensor to detect the wireless power receiving device being moved toward the charging apparatus;
   a wireless communication device to receive signals from the wireless power receiving device via a first communication protocol, the signals indicating whether the wireless power receiving device is compatible with a wireless charging standard;
   a Near Field Communication (NFC) reader to communicate with an NFC device in communication range of the charging apparatus wherein the NFC reader is configured to communicate via a second communication protocol different from the first communication protocol; and
   an electronic processor communicatively coupled to each of the transmission coil, the capacitive sensor, the wireless communication device, and the NFC reader, the electronic processor to:
   determine that an NFC device is in communication range of the NFC reader;
   determine whether the NFC device is built into the wireless power receiving device based on the data received from the wireless power receiving device via the first communication protocol that identifies whether the NFC device is a component of the wireless power receiving device;
   if determined that the NFC device is not built into the wireless power receiving device, mute a wireless power transfer from the transmission coil; and
   if determined that the NFC device is built into the wireless power receiving device, enable a wireless power transfer from the charging apparatus.

10. The system of claim 9, wherein the capacitive sensor detects a change in capacitance associated with a grounded body placing the wireless power receiving device onto the charging apparatus.

11. The system of claim 10, wherein a sensing range of the capacitive sensor is greater than a reading range of a near field communication tag.

12. The system of claim 9, further comprising a current sensor detecting a change in charging impedance due to the wireless power receiving device being introduced onto the charging apparatus.

13. The system of claim 9, wherein the wireless communication device receives an A4WP standard compliant response from an A4WP compliant receiver.

14. The system of claim 13, wherein the wireless communication device reads a bit in the A4WP standard compliant response that indicates existence of a near field communication component in the wireless power receiving device.

15. The system of claim 13, wherein the A4WP standard compliant response is compliant with a Bluetooth low energy standard.

16. The system of claim 9, wherein each of the wireless power receiving device is a telephone, a near field communication tag, a tablet computer, or a laptop computer.

17. A non-transitory computer-readable medium comprising instructions that control the processor to:
    detect a wireless power receiving device being present on a charging apparatus;
    determine that the wireless power receiving device is communicating with the wireless power receiving device via a first communication protocol;
    determine that a Near Field Communication (NFC) device is in communication range of the charging apparatus, wherein the NFC device is configured to communicate via a second communication protocol different from the first communication protocol;
    determine whether the NFC device is built into the wireless power receiving device based on information received from the wireless power receiving device via the first communication protocol that identifies whether the NFC device is a component of the wireless power receiving device;
    if determined that the NFC device is not built into the wireless power receiving device, mute a wireless power transfer from the charging apparatus; and
    if determined that the NFC device is built into the wireless power receiving device, enable a wireless power transfer from the charging apparatus.

18. The non-transitory computer-readable medium of claim 17, wherein to detect the wireless power receiving device comprises to use a capacitive sensor to sense a change in capacitance associated with a grounded body placing the wireless power receiving device onto the charging apparatus.

19. The non-transitory computer-readable medium of claim 18, wherein a sensing range of the capacitive sensor is greater than a reading range of a near field communication tag.

20. The non-transitory computer-readable medium of claim 17, wherein to detect the wireless power receiving device comprises to measure a change in charging impedance due to the wireless power receiving device being introduced onto the charging apparatus.

21. The non-transitory computer-readable medium of claim 17, wherein to determine that the NFC device is in communication range of the charging apparatus comprises to use a NFC reader to ascertain that a NFC standard compliant device has been placed on the charging apparatus.

22. The non-transitory computer-readable medium of claim 17, wherein to determine whether the NFC device is built into the wireless power receiving device comprises to read a bit in an A4WP standard compliant response that indicates existence of the NFC device in the wireless power receiving device.

* * * * *